(12) United States Patent
Hiroi et al.

(10) Patent No.: US 7,978,864 B2
(45) Date of Patent: Jul. 12, 2011

(54) AUDIO SIGNAL PROCESSING SYSTEM

(75) Inventors: Makoto Hiroi, Hamamatsu (JP);
Masatoshi Hanashiro, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 12/490,866

(22) Filed: Jun. 24, 2009

(65) Prior Publication Data
US 2009/0259328 A1 Oct. 15, 2009

Related U.S. Application Data

(62) Division of application No. 11/065,798, filed on Feb. 24, 2005.

(30) Foreign Application Priority Data

Feb. 27, 2004 (JP) ................................. 2004-053956
Feb. 27, 2004 (JP) ................................. 2004-053988

(51) Int. Cl.
H04B 1/00 (2006.01)
(52) U.S. Cl. ......................................... 381/119; 700/94
(58) Field of Classification Search .................. 381/119, 381/61, 1, 123, 104, 102; 700/94; 84/609, 84/600; 715/201, 205, 715–728
See application file for complete search history.

(56) References Cited

U.S. PATENT DOCUMENTS

| 5,386,568 | A | * | 1/1995 | Wold et al. ..................... 717/162 |
| 5,402,501 | A | | 3/1995 | Silfvajt et al. |
| 7,242,990 | B2 | | 7/2007 | Suyama et al. |
| 7,433,846 | B2 | | 10/2008 | Umeo et al. |
| 7,565,212 | B2 | | 7/2009 | Terada et al. |
| 2002/0193894 | A1 | * | 12/2002 | Terada et al. ................... 700/94 |
| 2003/0177073 | A1 | | 9/2003 | Ogai |
| 2005/0200989 | A1 | | 9/2005 | Goto et al. |

FOREIGN PATENT DOCUMENTS

| JP | 2000-293180 | * | 10/2000 |
| JP | 2000-293180 A | | 10/2000 |

OTHER PUBLICATIONS

"Owner's Manual for Yamaha Digital Mixing Engine DME 32" by Yamaha Corporation, Japan.

* cited by examiner

Primary Examiner — Xu Mei
Assistant Examiner — Lun-See Lao
(74) Attorney, Agent, or Firm — Morrison & Foerster LLP

(57) ABSTRACT

In a mixer system including an editing device that edits a configuration of signal processing by designating a combination of a plurality of components and a DSP that processes audio signals in accordance with the signal processing configuration edited by the editing device, when the mixer engine does not store a predetermined enabling key, audio signal processing including a protected component in the mixer engine is disabled, and when the mixer engine stores the predetermined enabling key, the audio signal processing is enabled. Further, the editing device is permitted to edit a signal processing configuration including the protected component irrespective of storage of the enabling key in the mixer engine.

2 Claims, 19 Drawing Sheets

F I G. 1 6
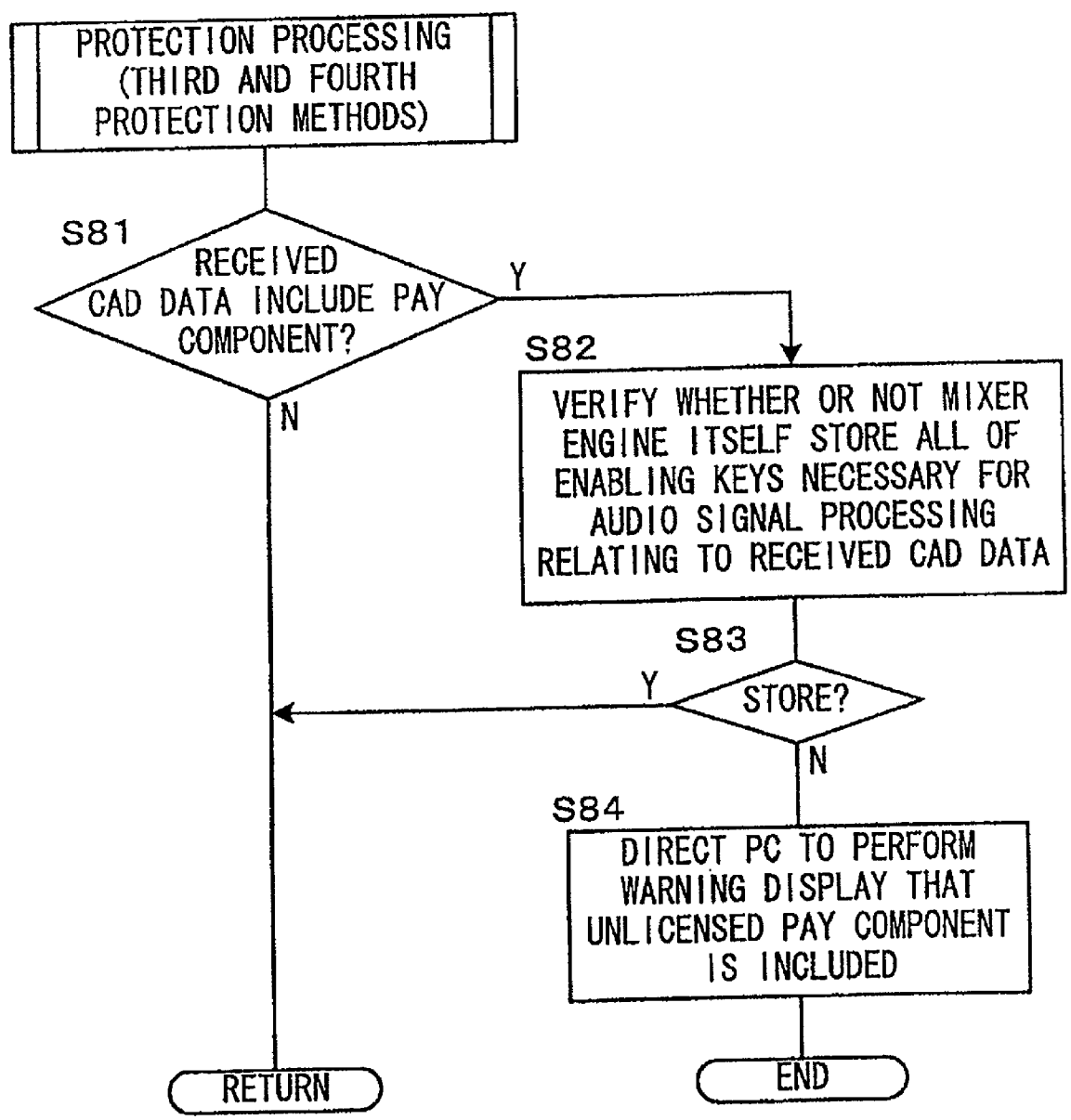

F I G. 1 7
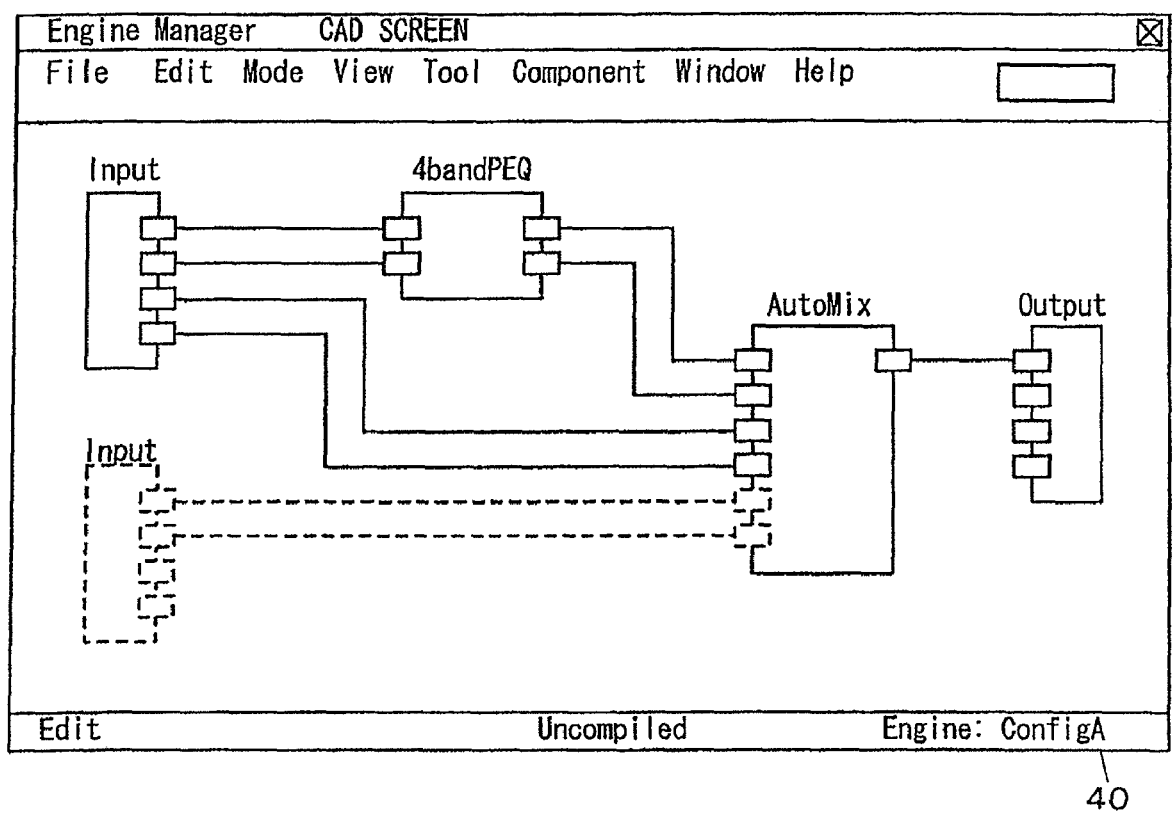

FIG. 18
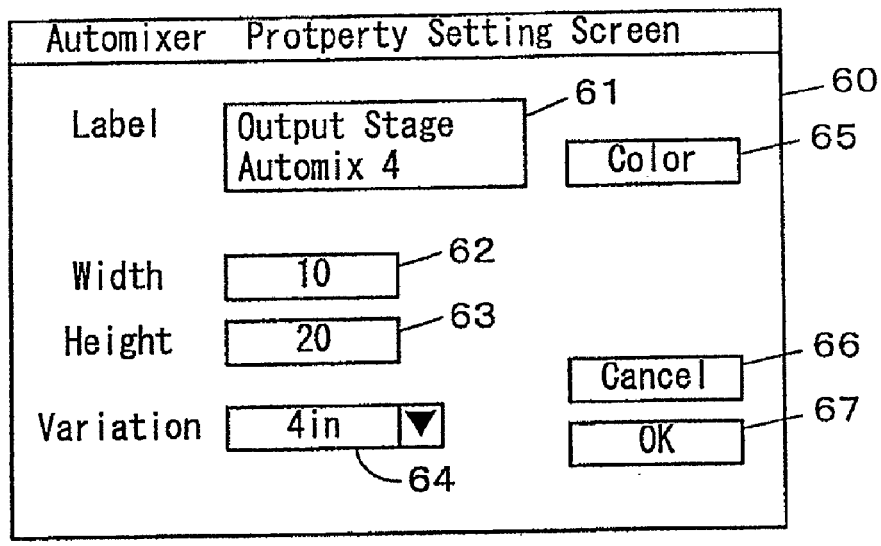
FIG. 19
FIG. 20A  FIG. 20B

FIG. 28A

PARAMETER ON
ORIGINAL COMPONENT

PARAMETER ON COMPONENT
AFTER REPLACEMENT (BEFORE COPYING)　　(AFTER COPYING)

| Ex |　　| Eo | → | Ex |

FIG. 28B

PARAMETER ON
ORIGINAL COMPONENT

PARAMETER ON COMPONENT
AFTER REPLACEMENT (BEFORE COPYING)　　(AFTER COPYING)

| E[1]x |
| E[2]x |
| E[3]x |
| E[4]x |

| E[1]o |
| E[2]o |
| E[3]o |
| E[4]o |
| E[5]o |
| E[6]o |

→

| E[1]x |
| E[2]x |
| E[3]x |
| E[4]x |
| E[5]o |
| E[6]o |

| E[1]o |
| E[2]o |

→

| E[1]x |
| E[2]x |

E[3]x AND E[4]x
ARE DISCARDED

FIG. 28C

PARAMETER ON
ORIGINAL COMPONENT

PARAMETER ON COMPONENT
AFTER REPLACEMENT (BEFORE COPYING)　　(AFTER COPYING)

| E[1][1]x | E[1][2]x | E[1][3]x |
| E[2][1]x | E[2][2]x | E[2][3]x |
| E[3][1]x | E[3][2]x | E[3][3]x |
| E[4][1]x | E[4][2]x | E[4][3]x |

| E[1][1]o | E[1][2]o |
| E[2][1]o | E[2][2]o |
| E[3][1]o | E[3][2]o |
| E[4][1]o | E[4][2]o |
| E[5][1]o | E[5][2]o |
| E[6][1]o | E[6][2]o |

→

| E[1][1]x | E[1][2]x |
| E[2][1]x | E[2][2]x |
| E[3][1]x | E[3][2]x |
| E[4][1]x | E[4][2]x |
| E[5][1]o | E[5][2]o |
| E[6][1]o | E[6][2]o |

E[1][3]x TO E[4][3]x
ARE DISCARDED

AUDIO SIGNAL PROCESSING SYSTEM

CROSS-REFERENCE TO RELATED APPLICATIONS

This application is a division of U.S. patent application Ser. No. 11/065,798, filed Feb. 24, 2005, the entire disclosure of which is incorporated herein by reference.

BACKGROUND OF THE INVENTION

1. Field of the Invention

The invention relates to an audio signal processing system including an editing device that edits a configuration of signal processing by designating a combination of a plurality of components and an audio signal processing device that processes audio signals in accordance with the signal processing configuration edited by the editing device, and a method of controlling the above-described editing device.

2. Description of the Related Art

Conventionally, there has been a well-known audio signal processing device in which a signal processing module is composed using a processor operable following a program, and an external computer such as a PC (personal computer) or the like executes application software to function as an editing device so that audio signals can be processed based on a configuration of signal processing edited using the editing device. Such an audio signal processing device is called a mixer engine in the present application. The mixer engine stores therein the configuration of signal processing edited by the PC and can independently perform processing on audio signals based on the stored configuration of signal processing.

For the edit of the configuration of signal processing on the editing device, the components being constituent elements for the signal processing in editing and a wiring status between their input and output nodes are graphically displayed on a display to allow users to perform editing work in an environment where the configuration of signal processing can be easily grasped visually. Then, a user can arrange desired processing components and set wires between the arranged components, thereby editing the configuration of signal processing.

The mixer engine and application software described above are described, for example, in Owner's Manual of a digital mixing engine "DME32 (trade name)" available from YAMAHA Co., especially pp. 23 to 66 (pp. 21 to 63 in English version).

SUMMARY OF THE INVENTION

When the audio signal processing device as described above operates, data for conducting necessary control on each component is generally stored on the editing device side and on the audio signal processing device side, respectively. The data is preferably version upgraded as necessary so that components can be added and changed.

However, since the data of component is stored as a part of firmware in the conventional mixer engine, the firmware needs to be updated for addition or update of components, thus requiring troublesome work and a long time.

In contrast to the above, the present assignee has proposed a system capable of individually supplying an ID to data of each component so that data for conducting control on the component can be individually added and updated for each component (Japanese Patent application No. 2003-389649, undisclosed).

When the above system is employed, addition and update of components can be relatively freely performed, thus making possible a business of selling a newly developed component separately from the basic system.

In such a business, however, since the object to be sold is data, the data sold to a client may be illegally copied and installed into a device without contraction for use, or illegally copied data may be marketed in a pirated edition.

Hence, there is a demand to provide a protection mechanism to prevent a component illegally obtained from being used for audio signal processing. However, such a component adding/updating method itself has not been known yet, bringing about a problem of there being no appropriate protection mechanism suitable for such a method.

An object of the invention is to solve the above-described problem and make it possible, in an audio signal processing system in which an editing device edits a configuration of signal processing in an audio signal processing device and the audio signal processing device performs signal processing in accordance with the edited contents, to effectively prevent illegal use of data on components of the signal processing while maintaining convenience and operability of the system.

Besides, when the signal processing configuration is edited using the above-described editing device, there occurs a problem of troublesome work being required when an already arranged component is replaced with another component.

For example, when a component of 4-input mixer which has been arranged is desired to be changed to a 6-input mixer because 5 inputs are required, or when a component of 8-input mixer which has been arranged is desired to be changed to a 4-input mixer to reduce resource usage of the signal processor (DSP) because only 3 inputs are in use, the following operations (1) to (3) have been required in the conventional system.

(1) Delete the original component from the edit screen. In this event, the wire connected to the deleted component is brought into a cut off state. There are a type in which the wire itself disappears from the screen, and a type in which the wire in the cut off state remains on the screen.

(2) Select a new component from a menu and arrange it on the edit screen.

(3) Reconnect the cut-off wire.

Among those operations, the reconnection of the wires has been especially troublesome.

Further, since the original component is deleted once and the new component is added in the conventional operational procedure, a parameter which has been set for the original component is also deleted with the component, and therefore the parameter needs to be set again for the new component. This has also been a cause to decrease the operability.

Another object of the invention is to solve the above problem and improve operability in replacing components for signal processing when an audio signal processing system is configured in which an editing device edits contents of signal processing in an audio signal processing device and the audio signal processing device performs signal processing in accordance with the edited contents.

To achieve the above objects, an audio signal processing system of the invention is an audio signal processing system including an editing device that edits a configuration of signal processing by designating a combination of a plurality of components and a signal processor that processes audio signals in accordance with the signal processing configuration edited by the editing device, the audio signal processing device or the editing device being provided with: a disabling device that disables audio signal processing in the audio signal processing device including a specific component of the components; and an enabling device that enables the audio signal processing including the specific component of the components when an enabling key is stored in the audio signal processing device, and the audio signal processing device being provided with a memory that stores the enabling key, wherein the editing device is permitted to edit a signal processing configuration including the specific component irrespective of storage of the enabling key in the audio signal processing device.

In the above-described audio signal processing system, it is preferable that the editing device is provided with: a transferring device that transfers data indicating the edited signal processing configuration to the audio signal processing device; and a device, as the disabling device, which disables the audio signal processing by disabling the transfer by the transferring device, for the signal processing configuration including the specific component.

Alternatively, it is also possible that the editing device is provided with: a converter that converts data indicating the edited signal processing configuration into a format suitable for processing in the audio signal processing device; and a device, as the disabling device, which disables the audio signal processing by disabling the conversion by the converter, for the signal processing configuration including the specific component.

Alternatively, it is also possible that the editing device is provided with a transferring device that transfers data indicating the edited signal processing configuration to the audio signal processing device, and that the audio signal processing device is provided with: a program generator that generates, based on the data indicating the signal processing configuration received from the editing device, a program for causing the signal processor to execute audio signal processing relating to the data; and a device, as the disabling device, which disables the audio signal processing by disabling the generation of the program by the program generator when the data received from the editing device is the data indicating the signal processing configuration including the specific component.

Alternatively, it is also possible that the editing device is provided with a transferring device that transfers data indicating the edited signal processing configuration to the audio signal processing device, and that the audio signal processing device is provided with: a program generator that generates, based on the data indicating the signal processing configuration received from the editing device, a program for causing the signal processor to execute audio signal processing relating to the data; and a device, as the disabling device, which disables the audio signal processing by disabling the execution of the program by the signal processor when the specific component is included in the signal processing configuration which is the base of the program generated by the program generator.

Further, it is preferable that the enabling device is a device that enables the audio signal processing including the specific component of the components only when identification data of the audio signal processing device storing the enabling key and identification data of the specific component are included in the enabling key.

Further, it is preferable that the editing device is provided with a retrieving device that retrieves the enabling key stored in the audio signal processing device.

Furthermore, it is preferable that the retrieval of the enabling key by the retrieving device is not allowed in a state in which the program for the audio signal processing including the specific component is installed in the audio signal processing device.

Alternatively, it is preferable that the editing device is provided with a supplier that supplies the enabling key retrieved by the retrieving device again to the audio signal processing device.

Further, a method of controlling an editing device of the invention is a method of controlling an editing device that edits in accordance with a direction accepted on a graphical screen a configuration of signal processing including a plurality of components each having an input node or an output node and wires connecting the output nodes and input nodes of the components in an audio signal processing device having an audio signal processor wherein processing contents can be programmed, the method for causing the editing device to store definition of a plurality of variations for at least one of the components, to store correspondence between nodes and between parameters included in the variations in the component, and to execute: a step of accepting a direction to change the variation for the component included in the signal processing configuration during edit when editing the signal processing configuration; when accepting the direction to change in the step, a step of replacing the component relating to the direction with a component of another variation in accordance with the direction; a first hand-over step of handing over to the component after the replacement, based on the stored correspondence, a wire which has a corresponding node also in the component after the replacement, among wires connected to nodes of an original component before the replacement; and a second hand-over step of handing over to the component after the replacement, based on the stored correspondence, a value of a parameter whose corresponding parameter exists also in the component after the replacement, among values of parameters relating to the original component.

In the above-described method of controlling an editing device, it is preferable that the second hand-over step includes: a step of preparing a storage area for the parameter corresponding to the component after the replacement; a write step of writing a value of a parameter whose corresponding parameter exists in the component after the replacement, among values of parameters relating to the original component, into an area for storing the value of the parameter of the storage area; and a step of setting a predetermined initial value for a parameter for which write has not been performed in the write step, among the parameters to be stored in the storage area.

The above and other objects, features and advantages of the invention will be apparent from the following detailed description which is to be read in conjunction with the accompanying drawings.

BRIEF DESCRIPTION OF THE DRAWINGS

FIG. 16 is a flowchart of protection processing relating to a third and a fourth protection method executed on the mixer engine side in the same;

FIG. 17 is a diagram, corresponding to FIG. 2, showing an example of an edit screen for explaining a change of variations of a component in the mixer system shown in FIG. 1;

FIG. 18 is a diagram showing an example of a property setting screen in the same;

FIG. 19 is a diagram showing a display example of a variation setting section on the property setting screen shown in FIG. 18;

FIG. 20A and FIG. 20B are diagrams showing other display examples of the same;

FIG. 28A to FIG. 28C are diagrams for explaining a copying method when the parameters composed of the elements as shown in FIG. 27A and FIG. 27B are handed over the component being a replacement source to the component after the replacement.

DETAILED DESCRIPTION OF THE PREFERRED EMBODIMENTS

Hereinafter, preferred embodiments of the invention will be concretely described with reference to the drawings.

Figure 1:
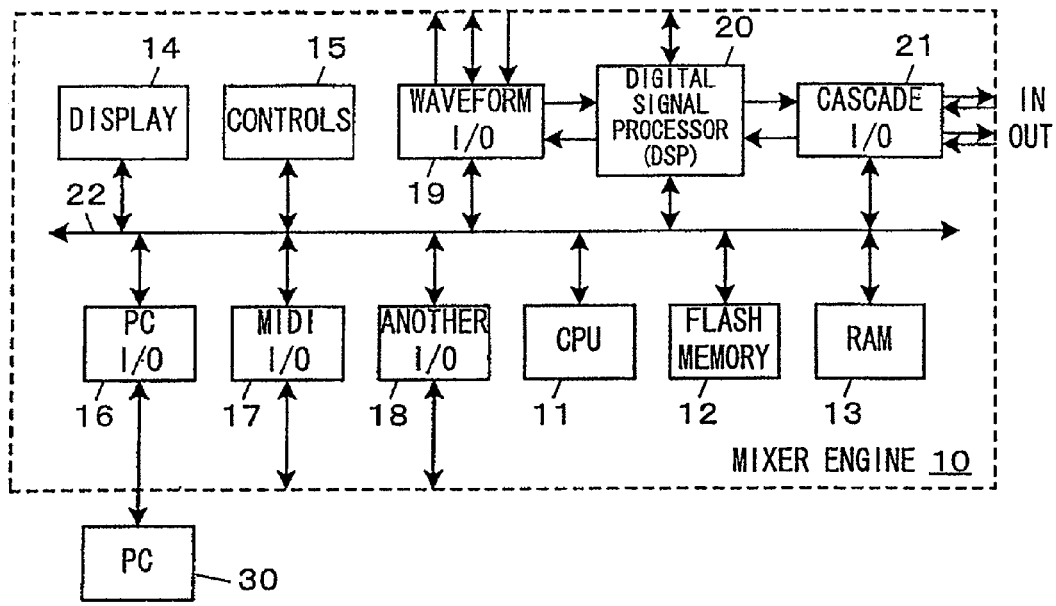
FIG. 1 is a block diagram showing a configuration of a mixer system being an embodiment of an audio signal processing system of the invention.
Figure 2:
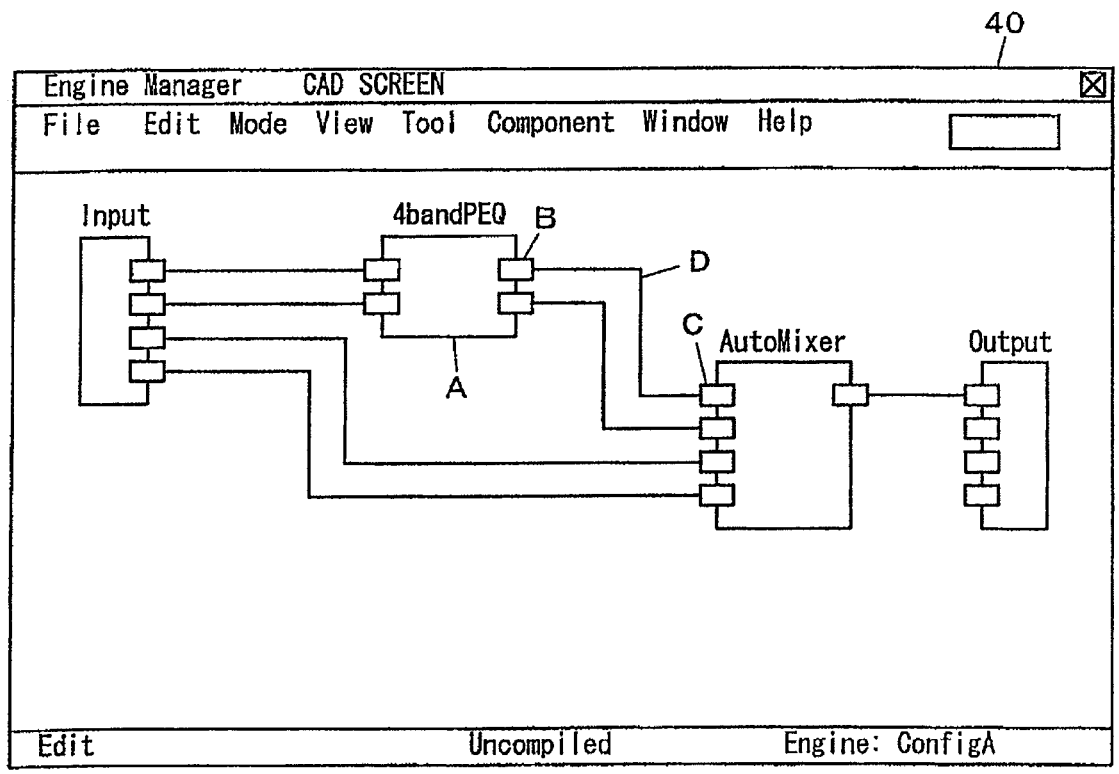
FIG. 2 is a diagram showing an example of an edit screen of a signal processing configuration displayed on a display of a PC shown in FIG. 1.

1. Description on Basic Configuration of Mixer System in Embodiment: FIG. 1 and FIG. 2

A configuration of a mixer system being an embodiment of an audio signal processing system of the invention which comprises a PC being an editing device and a mixer engine being an audio signal processing device will first be described using FIG. 1. FIG. 1 is a block diagram showing the configuration of the mixer system.

As shown in FIG. 1, the mixer system comprises a mixer engine 10 and a PC 30. The PC 30 can employ, as hardware, a well-known PC having a CPU, a ROM, a RAM and so on and a display, that is, a PC on which an operating system (OS) such as Windows XP (registered trademark) runs. By executing a necessary edit program as an application program on the OS, the PC 30 can function as the editing device which edits a configuration of signal processing in the mixer engine 10, transfers the edit result to the mixer engine 10, and causes the mixer engine 10 to operate in accordance with the edited configuration of signal processing. The operation and function of the PC 30 described below should be realized by executing the edit program unless otherwise stated.

On the other hand, the mixer engine 10 includes a CPU 11, a flash memory 12, a RAM 13, a display 14, controls 15, a PC input and output module (I/O) 16, a MIDI (Musical Instruments Digital Interface) I/O 17, another I/O 18, a waveform I/O 19, a digital signal processor (DSP) 20, and a cascade I/O 21, which are connected by a system bus 22. The mixer engine 10 has functions of generating a microprogram for controlling the DSP 20 in accordance with the configuration of signal processing received from the PC 30, operating the DSP 20 in accordance with the microprogram to thereby perform various signal processing on inputted audio signals and output them.

The CPU 11, which is a controller that comprehensively controls operation of the mixer engine 10, executes a predetermined program stored in the flash memory 12 to thereby perform processing such as controlling communication at each of the I/Os 16 to 19 and display on the display 14, detecting operations at the controls 15 and changing values of parameters in accordance with the operations, and generating the microprogram for operating the DSP 20 from data on the configuration of signal processing received from the PC 30 and installing the program in the DSP 20.

The flash memory 12 is a rewritable non-volatile memory that stores a control program executed by the CPU 11, later-described preset component data, an enabling key, and so on.

The RAM 13 is a memory that stores various kinds of data including later-described configuration data generated by converting the data on the configuration of signal processing received from the PC 30 into a required form and current data, and is used as a work memory by the CPU 11. Further, the configuration data storage area of the RAM 13 is power-backed up so that the mixer engine 10 can be independently used.

The display 14 is a display composed of a liquid crystal display (LCD) or the like. The display 14 displays a screen for indicating the current state of the mixer engine 10, a screen for referring to, modifying, saving, and so on of scenes being setting data contained in the configuration data, and so on.

The controls 15 are controls composed of keys, switches, rotary encoders, and so on, with which a user directly operates the mixer engine 10 to edit scenes and so on.

The PC I/O 16 is an interface for connecting the PC 30 thereto for communication, and capable of establishing communication via an interface of, for example, a USB (Universal Serial Bus) standard, an RS-232C standard, an IEEE (Institute of Electrical and Electronic Engineers) 1394 standard, an Ethernet (registered trademark) standard, or the like.

The MIDI I/O 17 is an interface for sending and receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP 20 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the waveform I/O 19, which actually inputs and outputs signals through the boards.

The another I/O 18 is an interface for connecting devices other than the above-described to perform input and output, and for example, interfaces for connecting an external display, a mouse, a keyboard for inputting characters, a control panel, and so on are provided.

The DSP 20 is a module which processes audio signals inputted from the waveform I/O 19 in accordance with the set microprogram and the current data determining its processing parameters. The DSP 20 may be constituted of one processor or a plurality of processors connected.

The cascade I/O 21 is an interface for transmitting/receiving audio signals and data, command, and so on from the PC 30 to/from other mixers, when a plurality of mixer engines 10 are cascade-connected for use. Note that when the plurality of mixer engines 10 are used in cascade connection, the plurality of mixer engines 10 can cooperatively operate to perform a series of audio signal processing. Further, the PC 30 can edit the above-described audio signal processing and transfer the edited result also to the other mixer engines 10 via the mixer engine 10 directly connected to the PC 30, thereby causing each of the mixer engines 10 to operate in accordance with the edited signal processing configuration.

Next, an editing scheme of the configuration of signal processing in the PC 30 will be described. FIG. 2 is a diagram showing an example of an edit screen of a signal processing configuration displayed on the display of the PC 30.

When the user causes the PC 30 to execute the above-described edit program, the PC 30 causes the display to display a CAD (Computer Aided Design) screen as shown in FIG. 2 as a graphical screen (which is "window" in the figure) to accept an edit direction from the user. In this screen, the configuration of signal processing during the edit is graphically displayed by components (A) such as a 4 bandPEQ, an AutoMixer, and the like and wires (D) connecting output nodes (B) and input nodes (C) of the components. Note that the nodes displayed on the left side of the components are the input nodes, and the nodes displayed on the right side are the output nodes. The components which exhibit input to the mixer engine 10 have only the output nodes, the components which exhibit output from the mixer engine 10 have only the input nodes, and all the other components have both the input nodes and the output nodes.

In this screen, the user can select components desired to be added to the configuration of signal processing from a component list displayed by operation of a "Component" menu, arrange them on the screen, and designate wires between any of the output nodes and any of the input nodes of the plurality of components arranged, to thereby edit the configuration of signal processing. By directing execution of "Save" in a "File" menu, the edited result is saved as a configuration (config). Further, by directing execution of "Compile" in the "File" menu, the data format of a part of the configuration data can be converted into the data format for the mixer engine, and then the configuration data can be transferred to and stored in the mixer engine 10.

Note that, the PC 30 calculates during the edit the amount of resource required for the signal processing in accordance with the configuration of signal processing on the screen, so that if the amount exceeds that of the resource of the DSP 20 included in the mixer engine 10, the PC 30 informs the user that such processing cannot be performed.

Further, for each of the components included in the configuration of signal processing, a storage region for storing parameters (for example, the level of each input or the like if it is a mixer) of the component is prepared, when the component is newly disposed and compiled in the configuration of signal processing, in the current scene where the current data is stored, and predetermined initial values are given as the parameters.

Then, the user can edit the parameters stored in the parameter storage region by operating a parameter control panel provided for each component. Further, a plurality of resultant parameters edited here and stored in the current scene are stored in a scene memory in a configuration, as the scene being setting data on the configuration, so that the parameters can be arbitrarily recalled to the current scene when the mixer engine 10 performs signal processing in accordance with the configuration.

Further, the user can set either a non-online mode or an online mode as the operation mode of the mixer engine 10 and the PC 30. In the non-online mode, the mixer engine 10 and the PC 30 operate independently from each other, while, in the online mode, they operate maintaining mutual synchronization of parameters and so on in the current memory. They can shift to the online mode only when the configuration of signal processing of the mixer engine 10 matches the configuration of signal processing of the PC 30. In the online mode, the mixer engine 10 and the PC 30 are controlled (synchronized) such that their data of the current scenes become identical.

Further, when shifting to the online mode, the user can select either the current scene on the mixer engine 10 side or the current scene on the PC 30 side for use as the current scene after synchronization, and further direct that the contents stored in the scene memories should also be synchronized.

After shift to the online mode, the operation performed on the PC 30 side is immediately reflected on the operation of the mixer engine 10, while the operation performed on the control 15 of the mixer engine 10 is immediately reflected on the operation of the PC 30, whereby they are controlled so that the contents of the current scenes of both of them become identical. Note that it is also adoptable to automatically shift them to the online mode when the above-described "Compile" is executed, and to automatically shift them to the non-online mode when the configuration of signal processing on the PC 30 side is changed.

Figure 3:
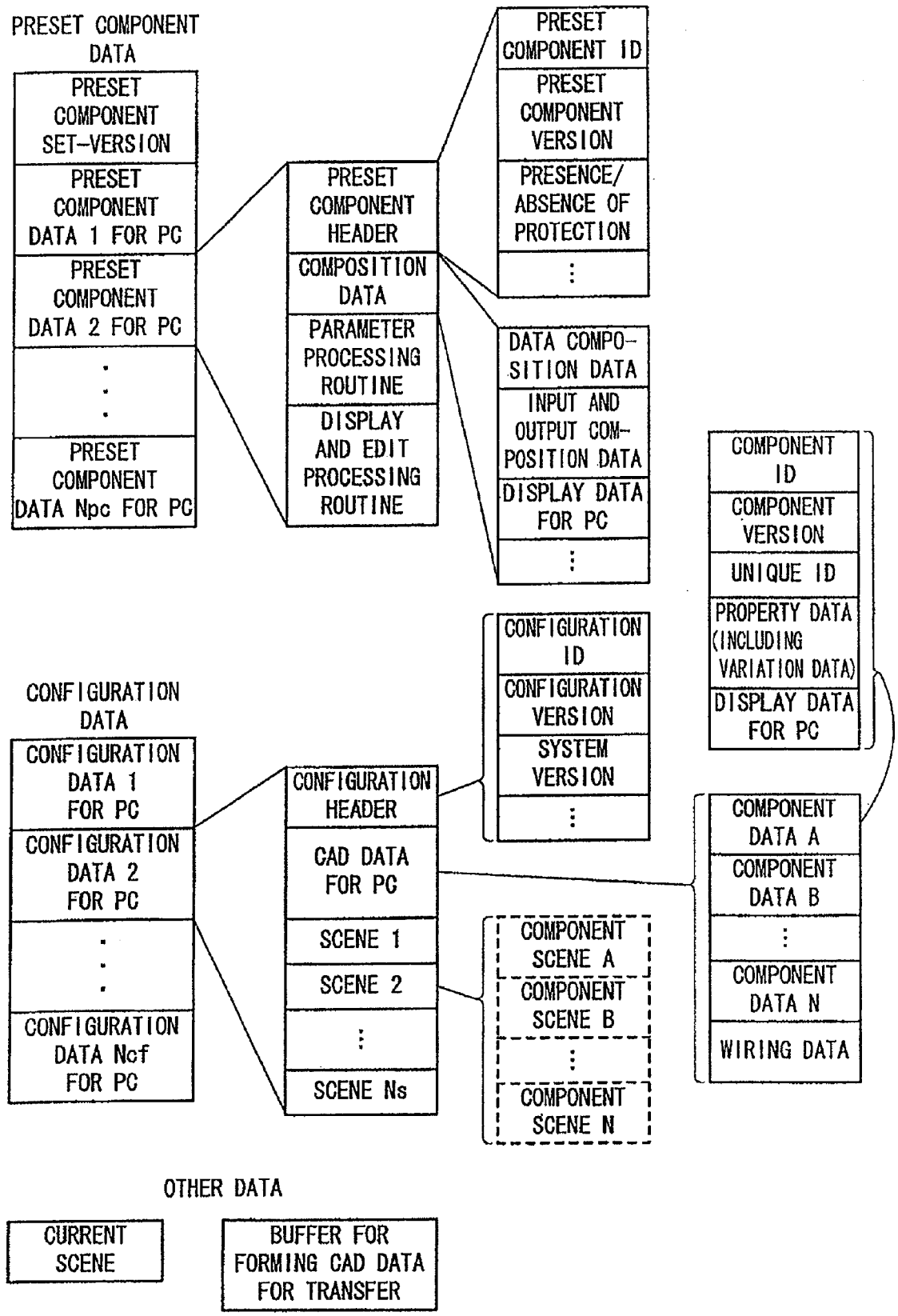
FIG. 3 is a diagram showing a configuration of data for use on the PC side of data relating to the invention.
Figure 4:
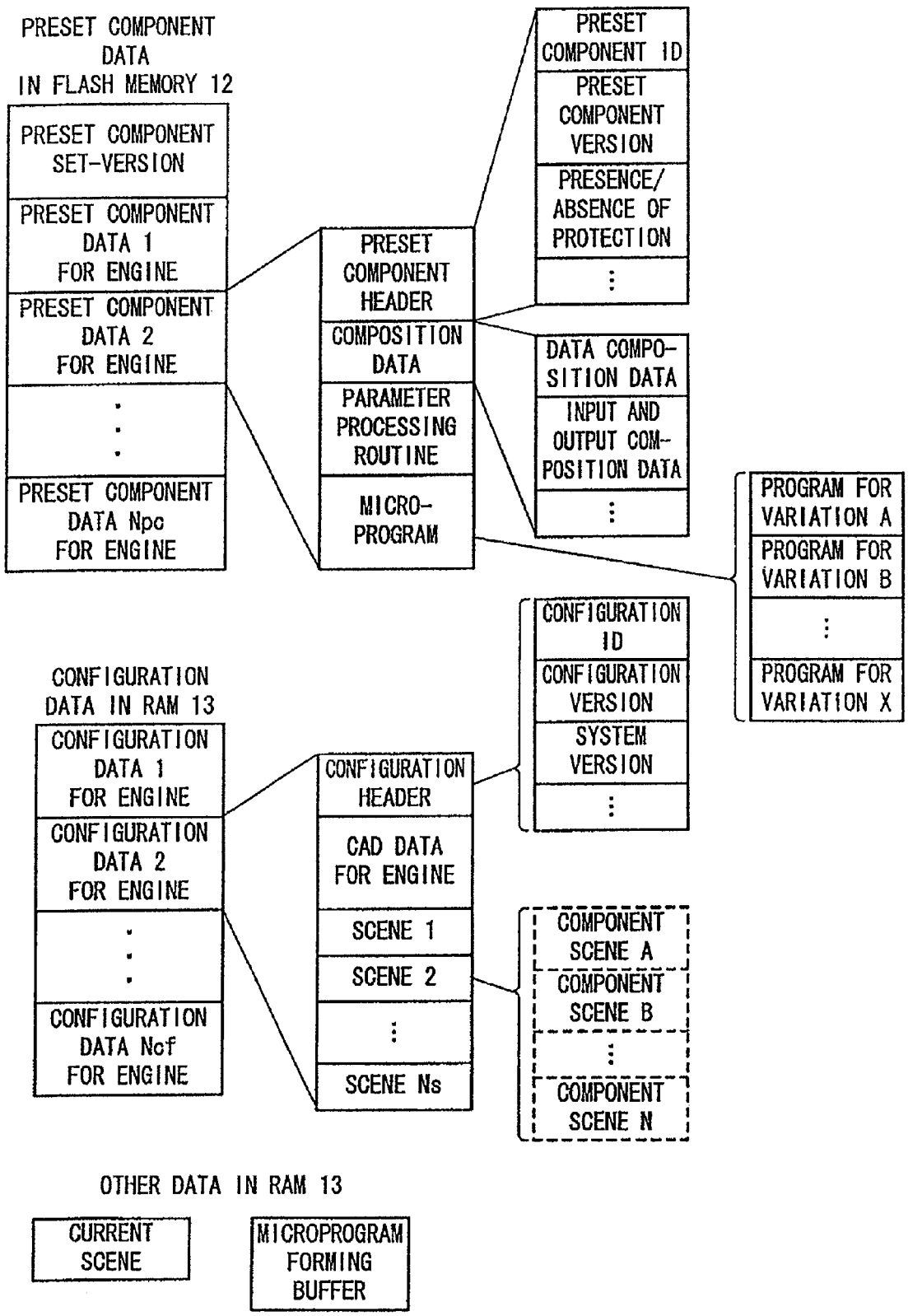
FIG. 4 is a diagram showing a configuration of data for use on a mixer engine side of the same.
Figure 5:
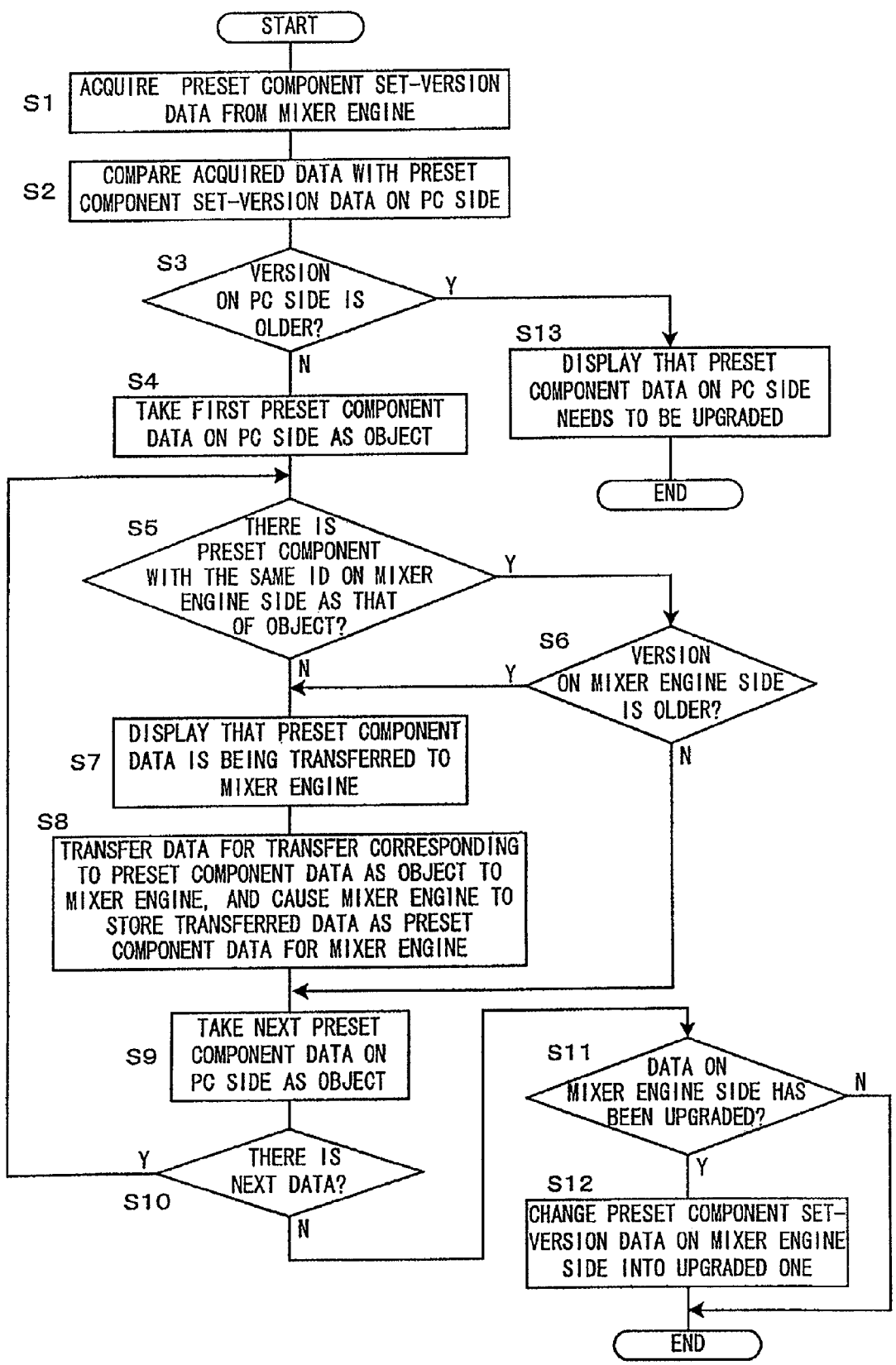
FIG. 5 is a flowchart showing consistency check and upgrade processing of preset component data executed by the PC shown in FIG. 1.
Figure 6:
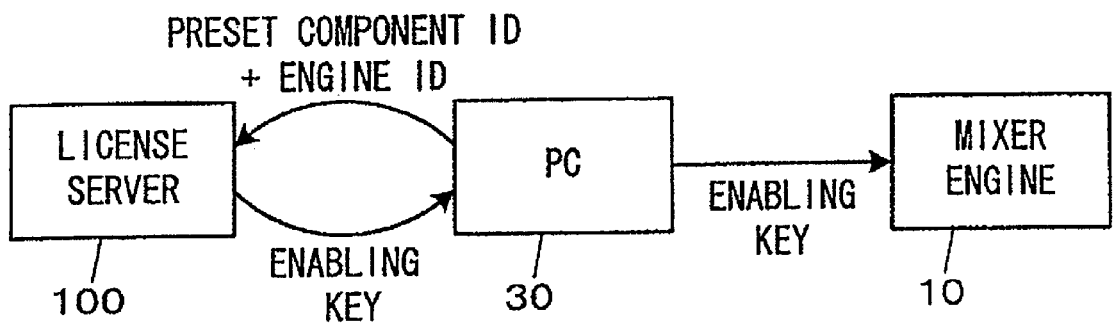
FIG. 6 is a diagram for explaining a first key managing method for managing an enable key in the mixer system shown in FIG. 1.

2. Description on Configuration of Data for use in Mixer System of Embodiment: FIG. 3 to FIG. 5

The configuration of data associated with the invention for use in the above-described mixer system will be described below.

First, the configuration of data for use on the PC 30 side will be shown in FIG. 3.

As shown in the drawing, when the above-described edit program is executed on the OS of the PC 30, the PC 30 stores preset component data and configuration data in a memory space defined by the edit program.

Of them, the preset component data is a set of data on components which can be used in editing signal processing and basically supplied from its manufacturer, although it may be configured to be customizable by the user. The preset component data includes data of preset component set-version data being version data for managing the version as the whole data set, and preset component data for PC prepared for each kind of the plurality of components constituting the data set.

Each preset component data for PC, which is data indicating the property and function of a component, includes: a preset component header for identifying the component; composition data showing the composition of the input and output of the component and data and parameters that the component handles; a parameter processing routine for performing processing of changing the value of the individual parameter of each component in each scene in the above-described current and scene memory in accordance with the numerical value input operation by the user; and a display and edit processing routine for converting the parameters of each component in the scenes into text data or a characteristic graph for display.

The preset component header includes data on a preset component ID being identification data indicating the kind of the preset component and a preset component version indicating its version, with which the preset component can be identified.

Further, in this mixer system, a part of the preset components is protected so that execution of audio signal processing including the protected preset component is permitted only when the user has a predetermined enabling key. Hence, data on the presence/absence of protection indicating whether or not the component is to be protected is also described in the preset component header.

The above-described composition data also includes: the name of the component; display data for PC indicating the appearance such as color, shape, and so on of the component when the component itself is displayed in the edit screen, the design of the control panel displayed on the display for editing the parameters of that component, and the arrangement of the knobs and the characteristic graph on the control panel; and so on, as well as the input and output composition data indicating the composition of the input and output of the component, and the data composition data indicating the composition of data and parameters that the component handles.

The above-described preset component ID relates to the data composition data, and the components having preset component IDs matching each other therefore have compatibility of data and parameters with each other. Accordingly, later-described copying of parameters between different compositions is possible between the components having the same preset component ID.

Among the preset component data for PC, the display data for PC necessary for editing in the edit screen in graphic display in the composition data, the routine for displaying the characteristics in a graph form on the control panel in the display and edit processing routine, and so on, which are not required for the operation on the mixer engine 10 side, are stored only on the PC 30 side.

Note that this mixer system is designed such that a plurality of variations can be defined for each preset component. The variations mean components which are identical in basic function of processing but different in the number of times of repeating processing, for example, components different in the number of input nodes or output nodes in the case of a mixer, or components different in the number of filters (bands) per channel in the case of an equalizer. Still other concrete examples will be shown in Table 1.

Such components are identical in the basic function of processing and therefore have similar compositions of parameters for use in processing. It is more efficient to manage such components as the preset components mutually associated as variations than to manage all of them separately, which is the reason why such a managing method is employed. In other words, the variations have compatibility of data with each other and, as a matter of course, have the same preset component ID.

Therefore, the display data for PC, the data composition data, and the input and output composition data can be scalably configured for each variation, so that the display data for PC, the data composition data, and the input and output composition data are common among a plurality of variations of one preset component. Note that the input and output composition data include data indicating the correspondence between nodes and between parameters included in the variations in the same preset component.

On the other hand, the configuration data, which is data indicting the configuration of signal processing that the user edits, is saved when the user selects save of the edit result, in such a manner that the configuration of signal processing, the setting values and so on at that point in time are saved as one set of configuration data for PC. Further, the user can direct to store a plurality of sets of configuration data for PC as shown in FIG. 3 as one file into the hard disk and conversely to load the data from the hard disk into the RAM. Then, in response to the direction, the plurality of configuration data for PC are written into the hard disk as one file or read out into the RAM.

Further, the user can select one of the plurality of configuration data for PC on the RAM of the PC 30 as the configuration data being an edit object in the edit program. The PC 30 (the process of edit program) then prepares to edit the configuration data for PC (prepares to access the CAD data for PC, each scene, and parameters of the corresponding current scene which will be described below) irrespective of whether or not the selected configuration data for PC includes a component to be protected.

Further, each configuration data for PC includes: a configuration header for identifying the configuration data; CAD data for PC indicating the contents of the edited configuration of signal processing; and scenes being the above-described setting data.

Among these, the configuration header includes data such as a configuration ID uniquely assigned when the configuration is newly saved, a configuration version indicating a modified version by changing when the configuration data is modified, a system version indicating the version of the edit program with which the configuration data is created, and so on. In other words, when certain configuration data is edited and compiled in sequence, those configuration data are given the same configuration ID and version data modified every the data is compiled.

Besides, the CAD data for PC includes component data on each component included in the edited configuration of signal processing and wiring data indicating the wiring status between the components. Note that if a plurality of preset components of the same kind are included in the configuration of signal processing, discrete component data is prepared for each of them.

Each component data includes: a component ID indicating what preset component that component corresponds to; a component version indicating what version of preset component that component corresponds to; a unique ID being an ID uniquely assigned to that component in the configuration of signal processing in which that component is included; property data including variation data indicating what variation that component is, among the preset components indicated by the component ID; and display data for PC indicating the position where the corresponding component is arranged in the edit screen on the PC 30 side and so on.

The unique IDs here are IDs used for associating, among the configuration data having the same configuration ID, the components included in configuration data, and managed as follows.

Specifically, when a new component is arranged on the above-described edit screen of the signal processing configuration, that component is given a new unique ID unused in the configuration data during edit, and added to the CAD data for PC. Besides, when the variation or version of an already arranged component is changed, the unique ID and component ID of that component are not changed, but the property data or component version is updated. In addition, when an already arranged component is deleted, that component is deleted from the CAD data for PC, and its unique ID is disused as a used ID, so that it is never used in the same configuration data again.

Besides, the wiring data includes, for each wiring of a plurality of wirings included in the edited configuration of signal processing: connection data indicating what output node of what component is being wired to what input node of what component; and display data for PC indicating the shape and arrangement of that wiring in the edit screen on the PC 30 side.

Besides, each scene in the scene memory is an aggregation of component scenes being parameters on each component of the configuration of signal processing, and the format and array of data in each component scene are defined by the data composition data in the preset component data for PC of the preset component which is identified by the component ID and the component version of that component included in the CAD data for PC, and the property data of that component included in the CAD data for PC.

The above are main data for use on the PC 30 side, and these data may be stored in a non-volatile memory such as an HDD (hard disk drive) or the like and read out into the RAM for use when required.

In addition to the above data, the PC 30 also stores the current scene being the setting data which is currently effective in the currently effective configuration. The data of the current scene has the same configuration as that of each scene in the above-described scene memory, so that when the parameters of one component in the configuration of signal processing are edited on the control panel or the like, the edit is performed by modifying the parameters of that component in the current scene and the result can be saved in the scene memory as one scene.

Further, in the PC 30, a buffer for forming, from the CAD data for PC, CAD data for transfer to engine in the format suitable for the processing in the mixer engine 10 when transferring the configuration data to the mixer engine 10 in the above-described "Compile" processing is provided. Note that the CAD data for transfer to engine is created by deleting from the CAD data for PC the data not in use on the mixer engine 10 side such as the above-described display data for PC on the component and wiring and further cutting off a portion not in use between the data for packing.

Next, the configuration of data to be stored on the mixer engine 10 side will be shown in FIG. 4.

As shown in the drawing, on the mixer engine 10 side, preset component data and configuration data are also stored as primary data. Incidentally, the preset component data is stored in the flash memory 12 and the configuration data in the RAM 13, their configuration contents being slightly different from those on the PC 30 side. Hence, points different from the data to be stored on the PC 30 side will be mainly described.

As shown in FIG. 4, the preset component data on the mixer engine 10 side includes preset component data for engine. The preset component data for engine is data for causing the mixer engine 10 to perform audio signal processing on each component, and is firstly different from the preset component data for PC in that it includes the microprogram for operating the DSP 20 to function as that component, in place of a part of the display and edit routine.

Note that this microprogram is different for each of the variations even though they are the same preset component and therefore individually stored for each variation. The variations, however, are in a relationship where they are different in the number of times of repeating the common basic processing, thus allowing such a way of coping in which their microprograms are made common for the common portion of the processing and the number of repeated execution times of the program is changed depending on the variation. In this case, although the number of processing steps and the amounts of resources such as the delay memory and the register for executing the signal processing relating to the component differ according to the variation, the amount of microprogram to be stored can be fixed. Whether the aforementioned way of coping is possible depends on the architecture of the DSP 20.

Further, since edit of the configuration of signal processing and display of the characteristic graph of the parameter are not performed on the mixer engine 10 side, the display data for PC included in the composition data for the PC and a part of routine such as a routine of displaying the characteristic graph of the display and edit routine for PC, are not included. Note that also on the mixer engine 10 side, the setting values of parameters can be displayed on the display 14 and edited by the control 15. Therefore, the routine for converting the values of the parameters into text data for display of the display and edit routine for PC is required and included in the parameter processing routine.

The preset component data is the same as that on the PC 30 side in points other than the above, so that the same ID and version as those of the corresponding sets and components on the PC 30 side are used to enable recognition of the correspondence therebetween.

Secondly, as for the configuration data, the configuration data for engine is different from that for PC 30 in that it includes CAD data for engine in place of the CAD data for PC. Here, the CAD data for engine is the CAD data for transfer to engine received from the PC 30 and stored, which is created by deleting the display data for PC from the CAD data for PC and packing as described above.

The configuration data is the same as that on the PC 30 side in points other than the above, so that the same ID and version as those of the corresponding configurations and components on the PC 30 side are used to enable recognition of the correspondence therebetween.

Note that the mixer engine 10 is for processing audio signals based on the configuration of signal processing edited on the PC 30. Accordingly, the CPU 11 forms the microprogram which the DSP 20 executes, based on the CAD data for engine received from the PC 30, and thus has a microprogram forming buffer prepared as a work area for the formation.

In microprogram forming processing, the above-described microprogram designated by the variation data is sequentially read out from the preset component data specified by the component ID and the component version of each component included in the CAD data for engine, assignment of resources such as an input/output register, a delay memory, a store register, and so on which are required for operation of each component is performed based on the variation data in the property data of each component and the specified preset component data; and the microprogram is processed based on the assigned resources and then written into the microprogram forming buffer.

In this event, a program for passing data between the input/output registers corresponding to the input and output nodes of the components is also written into the microprogram forming buffer based on the wiring data included in the CAD data for engine.

The reason why the microprogram is processed based on the resource assignment here is to correspond it to the architecture of the DSP 20 included in the mixer engine 10. Therefore, for another architecture, a parameter corresponding to the assigned resource, for example, may need to be set in the DSP 20 in place of processing the microprogram itself.

The preset component data for engine shown here in FIG. 4 is data to be transferred from the PC 30 to the mixer engine 10 and stored by consistency check and upgrade processing of the preset component data which will be described below. The data for transfer may be stored on the PC 30 side as independent data separate from the preset component data for PC, or may be stored in the preset component data for PC as a part of each component. In the latter case, when the preset component data is transferred to the mixer engine 10, data for transfer is generated by cutting off unnecessary data from the preset component data for PC.

Next, consistency check and upgrade processing of the preset component data in the above-described PC 30 will be described. A flowchart of this processing is shown in FIG. 5.

In the mixer system shown in FIG. 1, when a preset component is newly developed or improved, the manufacturer can provide the change in the form of version upgrade of the edit program. In this situation, the edit program after the version upgrade includes preset component data for PC and that for engine including data on the newly developed or improved preset component. When this is installed into the PC 30, these data are stored in the PC 30.

In execution of the edit program by the PC 30 in this state, when directed to upgrade the preset component data in the mixer engine 10, the PC 30 carries out consistency check and upgrade of the preset component data by performing the processing shown in the flowchart in FIG. 5. The PC 30 preferably recognizes the time, for example, when the PC 30 is physically connected to the mixer engine 10 during operation of the edit program, when the mixer engine 10 physically connected to the PC 30 is turned on during operation of the edit program, when the edit program is started on the PC 30 physically connected to the mixer engine 10 during operation, or the like, as the above-described update being directed, and starts the processing.

In this processing, first in Step S1 and Step S2, the version data on the preset component set on the PC 30 side is compared with that on the mixer engine 10 side, and if the version on the PC 30 side is older, the flow proceeds from Step S3 to Step S13, in which such a display that the preset component data (or the edit program including the data) on the PC 30 side needs to be upgraded is displayed on the display to thereby prompt the user to upgrade it. This is because, in this mixer system, normal control of the mixer engine 10 cannot be performed unless the components included in the preset component data on the PC 30 side match those on the mixer engine 10 side, but the edit program on the PC 30 side can be relatively easily version-upgraded.

Incidentally, this situation rarely happens because the preset component data on the mixer engine 10 side is upgraded by transmitting new data from the PC 30 which has the edit program version-upgraded. However, such a situation may happen when, for example, a plurality of PCs 30 are provided, one of them which has the version-upgraded edit program is connected to the mixer engine 10, and thereafter another PC 30 which has not been version-upgraded yet is connected.

On the other hand, if the version on the PC 30 side is not older, the flow proceeds from Step S3 to Step S4 and thereafter. Taking the preset component data on the PC side as an object in sequence in the processing up to Step S10, when there is no preset component data with the same ID on the mixer engine side as that of the object (S5), or when there is preset component data with the same ID as that of the object but the version on the mixer engine side is older (S6), the preset component data corresponding to the ID is upgraded. Then, this upgrade is performed by transferring the preset component data for transfer stored in the PC 30 to the mixer engine 10, and causing the mixer engine to store the data in the flash memory 12 as the preset component data for engine, while displaying on the display that data is being transferred (S7 and S8).

After completion of the above-described processing on all of the preset component data on the PC side, the preset component data which need to be upgraded are all upgraded, and then the flow proceeds to Step S11 and thereafter, in which when upgrade has been performed, the version data on the preset component set on the mixer engine 10 side is changed into upgraded one, and the processing ends. If the upgrade has been already carried out and thus the data on the PC 30 side is consistent with that on the mixer engine 10 side, there is no need to upgrade the data again and thus the processing is ended as it is.

By causing the PC 30 to execute the above-described processing, the edit program is version-upgraded, so that even when a component is newly developed or improved, the data on the component on the mixer engine 10 side can also be automatically upgraded only by installing the component once on the PC 30 side, and then activating the PC 30 and connecting it to the mixer engine 10. Accordingly, upgrade work for the whole mixer system can be easily carried out.

Further, for newly developed or improved components, the preset component data can be replaced with new one for every component.

Note that, in the processing shown in FIG. 5, the processing in Step S5 is processing of coping with upgrade when a component is added, and the processing in Step S6 is processing of coping with upgrade when a component is improved (version-upgraded), and therefore performance of both of them is not essential.

Further, the judgment in Step S3 may be performed by comparison of the ID and version of each preset component rather than by comparison of the version data on the component set. In such a case, if there is a preset component having the same ID and an older version on the PC 30 side, or if there is a preset component which exists on the mixer engine 10 side but does not exist on the PC 30 side, the judgment in Step S3 is YES.

Furthermore, although the example in which upgrade is carried out without exception when a component is added or improved is shown in FIG. 5, it is also adoptable to display a dialog box on the display prior to the upgrade to ask the user whether the upgrade is necessary or not.

Further, it is also adoptable to divide the components into essential ones and inessential ones, so that the data on the inessential components can be deleted from the mixer engine and the PC. In this case, it is preferable not to perform upgrade nor give warning even if inconsistency is detected on the deleted components.

Further, in the processing shown in FIG. 5, it is preferable to manage the free space in the storage area prepared for storing the preset component data in the mixer engine 10, so as to judge whether or not the preset component data to be transferred to the mixer engine 10 can be stored in the free space, and to stop the transfer and warn of the fact when it cannot be stored there. The size of the storage area can be grasped from the model code of the mixer engine 10 or the like. Once the size of the preset component data for engine including that in the old version is stored, the space in use can be grasped by obtaining the data on the ID and version of the preset component stored in the mixer engine 10 and making a search based on the data.

3. Description on Protection of Components: FIG. 6 to FIG. 16

Next, protection of components in the mixer system will be described.

In this mixer system, audio signal processing relating to some specific components is permitted only when predetermined enabling keys are stored in the mixer engine 10, whereby the components are protected. The edit of the signal processing configuration including the components, however, is permitted irrespective of presence/absence of the enabling keys.

Further, the aforementioned enabling key is first transferred from a license server prepared by the manufacturer to the PC 30, and the PC 30 transfers it to the mixer engine 10. Then, the edit program executed in the PC 30 includes a key management program for managing the enabling key.

The reason why the enabling key is stored in the mixer engine 10 is that the correspondence between the presence/absence of the enabling key and permission of the audio signal processing is clearer when the key is stored in the device actually executing the audio signal processing. Further, it is possible to connect the mixer engine and the PC in any combination, and thus there is another reason that, in a configuration in which the mixer engine 10 is configured to be able to perform audio signal processing by itself, it is difficult to manage the permission of the audio signal processing for each of the mixer engines if the enabling key is stored on the PC 30 side.

In the description hereinafter, the preset component to be protected shall be called a "pay component" for convenience of description. However, this is not intended to limit the preset component to be protected to the component requiring fee for use. For example, it is also conceivable to perform protection only for managing users without requiring fee for the later-described enabling key.

Incidentally, there are two conceivable managing methods of the above-described enabling key as shown below. First, a first key managing method will be described using FIG. 6 and FIG. 7.

In the first key managing method, the PC 30 serves the function of only mediating transfer of the enabling key from a license server 100 to the mixer engine 10.

More specifically, in this method, the user first starts the key management program in the PC 30 to access the license server 100, transmits the ID (identification data) of a pay component which the user desires to unprotect and the ID of a mixer engine in which the user desires to use the pay component, and pays a fee for it. The license server 100 transfers the enabling key to the PC 30 after confirmation of payment of the fee. Upon reception of the enabling key, the PC 30 transfers it to the mixer engine 10 corresponding to the transmitted ID. The mixer engine 10 received the enabling key stores it in the flash memory 12 being a memory. Note that the storage area for storing the enabling key shall be provided, as a matter of course, within the area that is not operated by the user.

Payment of the fee and safe data transfer between the license server 100 and the PC 30 and between the PC 30 and the mixer engine 10 may be performed using arbitrary known techniques.

Figure 7:
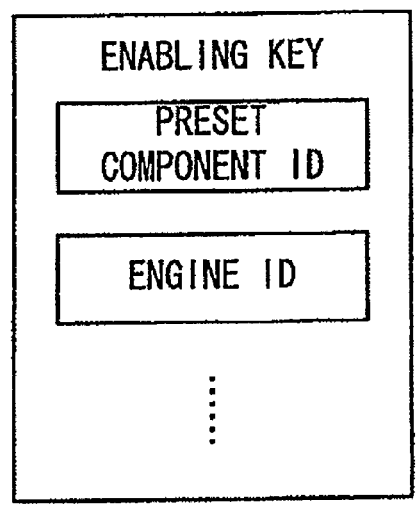
FIG. 7 is a diagram showing a configuration of the enabling key in the same.
Figure 8:
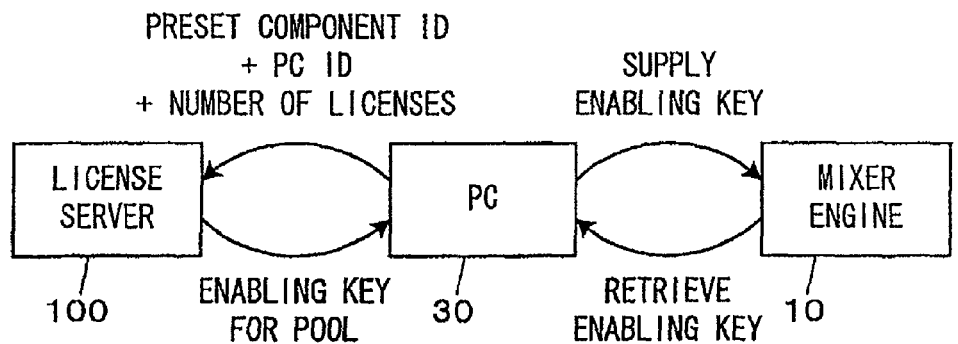
FIG. 8 is a diagram for explaining a second key managing method in the same.

The enabling key is preferably generated for each pay component and for each mixer engine, and preferably forms data, for example, as shown in FIG. 7, including data on the ID (preset component ID) of a pay component to be unprotected and the ID of the mixer engine in which the pay component is to be used. These kinds of data may be encrypted or compiled in a series of data by required calculation. Alternatively, it is also acceptable that predetermined calculation using the enabling key, the preset component ID, and the mixer engine ID provides a predetermined result or the like. Any type of enabling key is acceptable as long as it provides a license to the combination of a specific mixer engine ID and preset component ID.

Further, it is also possible that the above-described enabling key includes a serial number for sale in a package to a user as proposed in Japanese Patent application No. 2003-287367 by the present assignee so that the license can be managed using the serial number on the package.

Next, a second key managing method will be described using FIG. 8 to FIG. 12.

In the second key managing method, a key pool is provided in the PC 30 to allow the enabling key to be supplied/retrieved to/from any mixer engine connected to the PC 30.

More specifically, in this method, the user first starts the key management program in the PC 30 to access the license server 100, transmits the ID of a pay component which the user desires to unprotect, the device ID of the PC 30 or the ID of the edit program or the user, and the number of necessary enabling keys (the number of licenses), and pays a fee for it. The license server 100 transfers the enabling key for pool to the PC 30 after confirmation the payment of the fee. Upon reception of the enabling key, the PC 30 adds the received enabling key to its own key pool.

The form of the enabling key for pool is similar to that shown in FIG. 7 but includes the ID of the PC 30 and so on in place of the engine ID. If a plurality of enabling keys for pool for the same pay component are transferred, those keys may be completely identical keys or keys different from each other with serial numbers or the like assigned. Further, the key pool shall be provided at a position not operated by the user.

Then, when the user designates a mixer engine 10 being the supply destination of the enabling key and the kind of a pay component which the user desires to unprotect and directs the PC 30 to supply an enabling key, the PC 30 decreases the number of keys in the key pool and generates the enabling key as shown in FIG. 7 and transfers it to the mixer engine 10. The mixer engine 10 received the enabling key stores it in the flash memory 12 being a memory. Conversely, when the user designates a mixer engine 10 storing an enabling key and the kind of a pay component of which the use desires to retrieve the enabling key and directs the PC 30 to retrieve the enabling key, the PC 30 instructs the mixer engine 10 to erase the enabling key and increases the number of keys in its own key pool.

Figure 9:
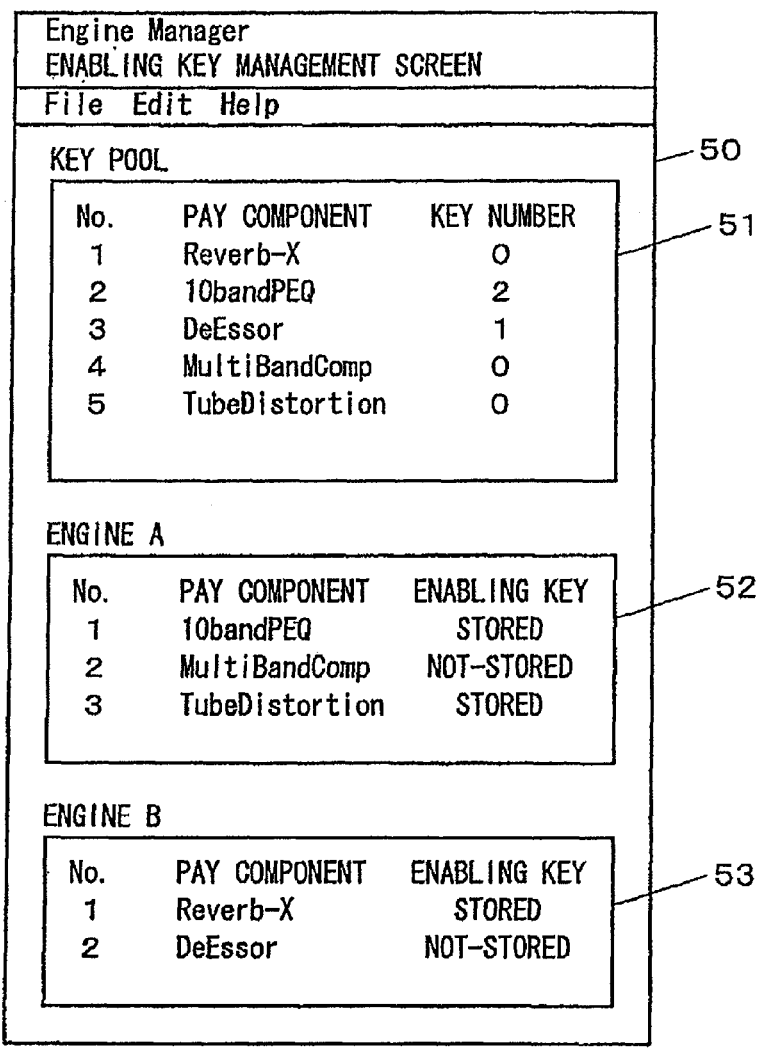
FIG. 9 is a diagram showing an example of an enabling key management screen displayed on the display of the PC shown in FIG. 1.

FIG. 9 shows a display example of a key pool management screen being a screen for directing to supply and retrieve the above-described enabling key.

An enabling key management screen 50 shown here illustrates an example where two mixer engines, an engine A and an engine B, are connected to the PC 30, and has three display sections such as a key pool management section 51, an engine A management section 52, and an engine B management section 53.

Of them, the key pool management section 51 is a display section that displays the number of enabling keys stored in the key pool of the PC 30, showing the number of enabling keys existing in the key pool about all of the pay components (preset components with protection set in their headers) stored in the PC 30.

The engine A management section 52 and the engine B management section 53 are display sections that display whether or not enabling keys corresponding to the respective pay components of the preset components stored in the mixer engines connected to the PC 30 are stored in the mixer engine. These display sections are provided in correspondence with the mixer engines connected to the PC 30, and data on stored/not-stored of the enabling keys to be displayed on the display sections is obtained by inquiring of the mixer engines at the time of display. Then, when the enabling key management screen 50 is erased, the data on the stored/not-stored does not need to be stored any longer.

Further, as seen from these display forms, the key pool of the PC 30 can retain a plurality of enabling keys for the same pay component but each mixer engine is configured to store only one enabling key for the same pay component.

On the above-described enabling key management screen 50, the user can drag from the key pool management section 51 the "key number" of the enabling key which the user desires to supply to the mixer engine and drop it on the engine management section corresponding to the mixer engine being the supply destination, thereby directing supply of the enabling key to the mixer engine. Conversely, the user can drag from the engine management section the "KEY" of the enabling key which the user desires to retrieve from the corresponding mixer engine and drop it on the key pool management section 51, thereby directing retrieval of the enabling key.

The user can also drag from the key pool management section 51 a "PAY COMPONENT" and drop it on the engine management section, thereby directing transfer of the pay component to the mixer engine. In this case, the PC 30 transfers the preset component data by processing similar to that in Steps S7 and S8 in FIG. 5 and updates the display on the enabling key management screen 50 in accordance with the state after the transfer.

A direction to delete the pay component may be issued also from the mixer engine, but it is preferable that the pay component whose enabling key is stored can be deleted only after the enabling key is retrieved in advance. Alternatively, it is also suitable that when the enabling key is stored, the enabling key is automatically retrieved from the mixer engine in accordance with the direction to delete the pay component, and thereafter the directed pay component is deleted.

Figure 10:
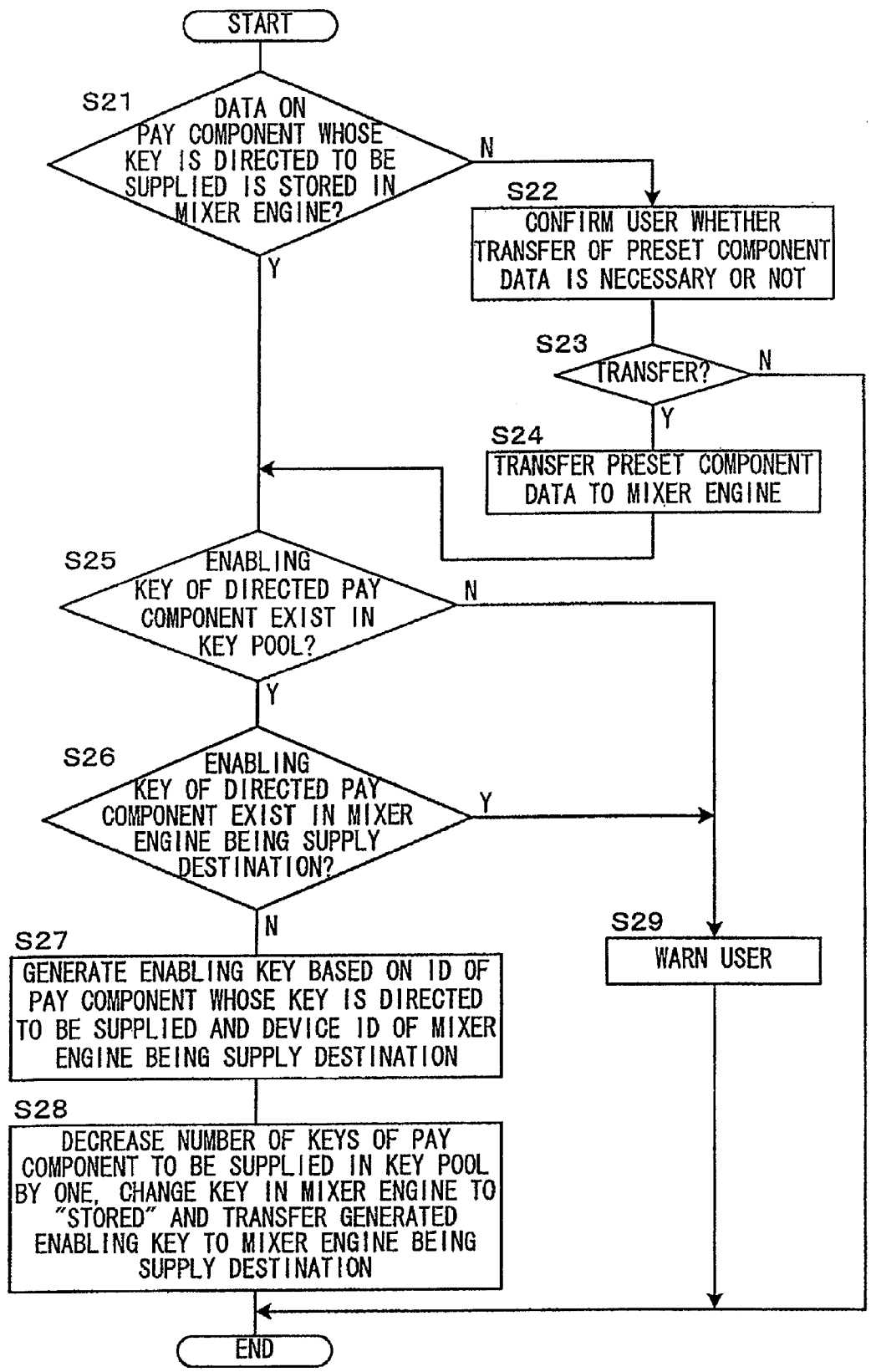
FIG. 10 is a flowchart showing processing executed when the PC shown in FIG. 1 receives a direction to supply an enabling key to the mixer engine in the second managing method.

When receiving a direction to supply an enabling key to the mixer engine, the CPU of the PC 30 executes processing shown in a flowchart of FIG. 10. First of all, when data on the pay component whose key the CPU is directed to supply is not stored in the mixer engine, the flow proceeds from Step S21 to Step S22 and thereafter. Then, in Steps S22 to S24, the CPU confirms the user whether transfer of the preset component data is necessary or not, and when receiving the direction to transfer it, the PC 30 transfers it. When receiving the direction not to transfer it, the CPU ends the processing as it is.

Besides, when the data is stored in Step S21 or after the transfer in Step S24, the flow proceeds to Step S25 in which the CPU judges whether or not the enabling key that the CPU is directed to supply exists in the key pool of the PC 30. If not, the CPU cannot supply the enabling key and therefore warn the user of the fact in Step S29 and ends the processing.

If the enabling key exists in Step S25, the flow proceeds to Step S26, in which the CPU judges whether or not the enabling key that the CPU is directed to supply has been already stored in the mixer engine being the supply destination. If it is stored, the CPU does not need to supply it, and therefore warns the user of the fact in Step S29 and ends the processing.

If the key is not stored in Step S26, the CPU generates an enabling key to be supplied to the mixer engine, and changes the number of keys in the key pool and the stored/not-stored of the enabling key in the mixer engine and transfers the generated enabling key to the directed mixer engine in Steps S27 and S28 and ends the processing.

By the above processing, when appropriately directed to supply the enabling key, the CPU allows the mixer engine 10 to store the enabling key in accordance with the direction.

It should be noted that it is not essential to perform the processing in Steps S22 to S24, and even when the judgment is NO in Step S21, the CPU may warn the user of the fact and end the processing. Further, the execution of the warning including that in Step S29 is not essential. Further, in the processing in Steps S27 and S28, the CPU of the PC 30 functions as a supplier.

Figure 11:
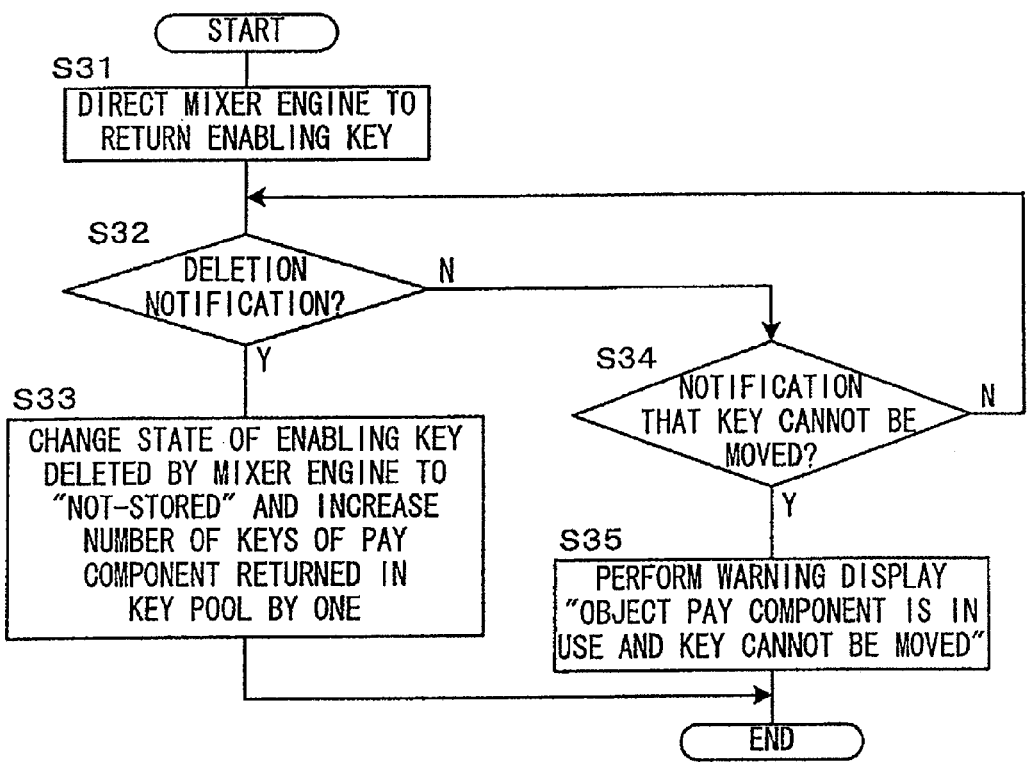
FIG. 11 is a flowchart showing processing executed when the PC receives a direction to retrieve the enabling key in the same.

On the other hand, when receiving a direction to retrieve the enabling key, the CPU of the PC 30 executes processing shown in a flowchart of FIG. 11. First of all, the CPU directs the mixer engine, which is directed as the retrieval destination, to return the enabling key in Step S31, and waits for a notification of response from the mixer engine in Steps S32 and S34.

Then, when the CPU receives a deletion notification, the flow proceeds from Step S32 to Step S33 in which the CPU changes the stored/not-stored of the enabling key in the mixer engine and the number of keys in the key pool in accordance with the deletion notification, and ends the processing. In this processing, the CPU of the PC 30 functions as a retrieving device.

On the other hand, when the CPU receives a notification that the key cannot be moved, the CPU recognizes that the pay component relating to the enabling key directed to be retrieved is being used in the mixer engine, and therefore performs warning display of the fact in Step S35 and ends the processing. Note that if the CPU received neither notification within a predetermined period, the CPU preferably executes error processing due to timeout.

Note that even when the CPU received the notification that the key cannot be moved, the CPU can retrieve the enabling key by changing the program installed in the DSP 20 to a program that does not use the pay component relating to the enabling key and then issuing the retrieval direction again.

Figure 12:
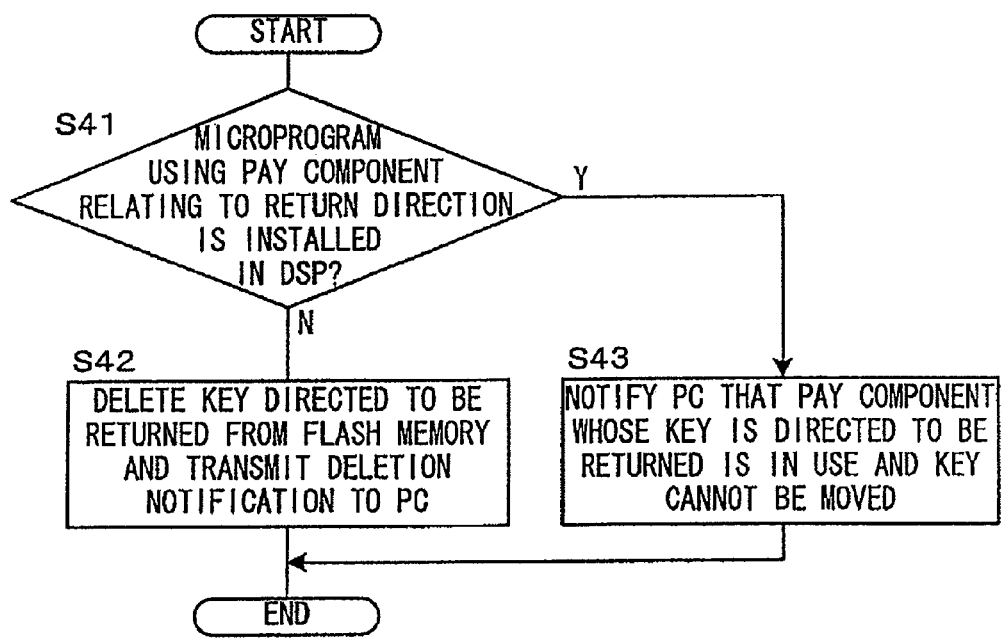
FIG. 12 is a flowchart showing processing executed when the mixer engine receives from the PC a direction to return the enabling key in the same.

Besides, when receiving from the PC 30 a direction to return the enabling key, the CPU 11 of the mixer engine 10 executes processing shown in a flowchart of FIG. 12. First of all, the CPU 11 judges whether or not the microprogram using the pay component relating to the return direction is installed in the DSP 20 in Step S41. If it is not installed, the pay component relating to the return direction is not in use and its enabling key can be returned, and therefore the CPU 11 deletes the enabling key relating to the return direction from the flash memory 12 and transmits the deletion notification indicating the fact to the PC 30 in Step S42 and ends the processing. Since the PC 30 manages only the number of enabling keys, it is not necessary to transmit the key itself here. Further, it is also unnecessary to consider from what PC the enabling key stored in the mixer engine 10 is transmitted.

Note that in the case in which a later-described first or second protection method is employed, when the enabling key is deleted here, the configuration data including the pay component corresponding to the enabling key to be deleted also needs to be deleted so that it is not left in the mixer engine 10.

On the other hand, when the microprogram is installed in Step S41, the pay component relating to the return direction is in use. If the enabling key is returned, audio signal processing relating to the pay component with no enabling key will be performed, and therefore the CPU 11 transmits to the PC 30 the notification that the key cannot be moved in Step S43 and ends the processing. Note that when the pay component relating to the return direction is in use, the CPU 11 may forcibly terminate the signal processing including that component and return the enabling key.

According to the above-described method, the enabling key can be moved as necessary though the processing is somewhat complicated as compared with the first key managing method, so that the key management can be performed with higher flexibility and convenience.

Next, processing of disabling audio signal processing relating to a pay component and processing of enabling the audio signal processing using the above-described enabling key will be described.

Such processing can be performed by executing predetermined protection processing in processing executed on the PC 30 side when the user directs it to compile configuration data (data indicating the edited signal processing configuration), or in processing executed by the mixer engine 10 when receiving the CAD data for transfer to engine to be transferred by the above processing. The protection processing is preferably performed at any of the later-described four points. Hereinafter, the whole processing flow will be first described, and then contents and insertion points of the protection processing (as shown by broken lines in FIG. 13 and FIG. 14) will be described.

Figure 13:
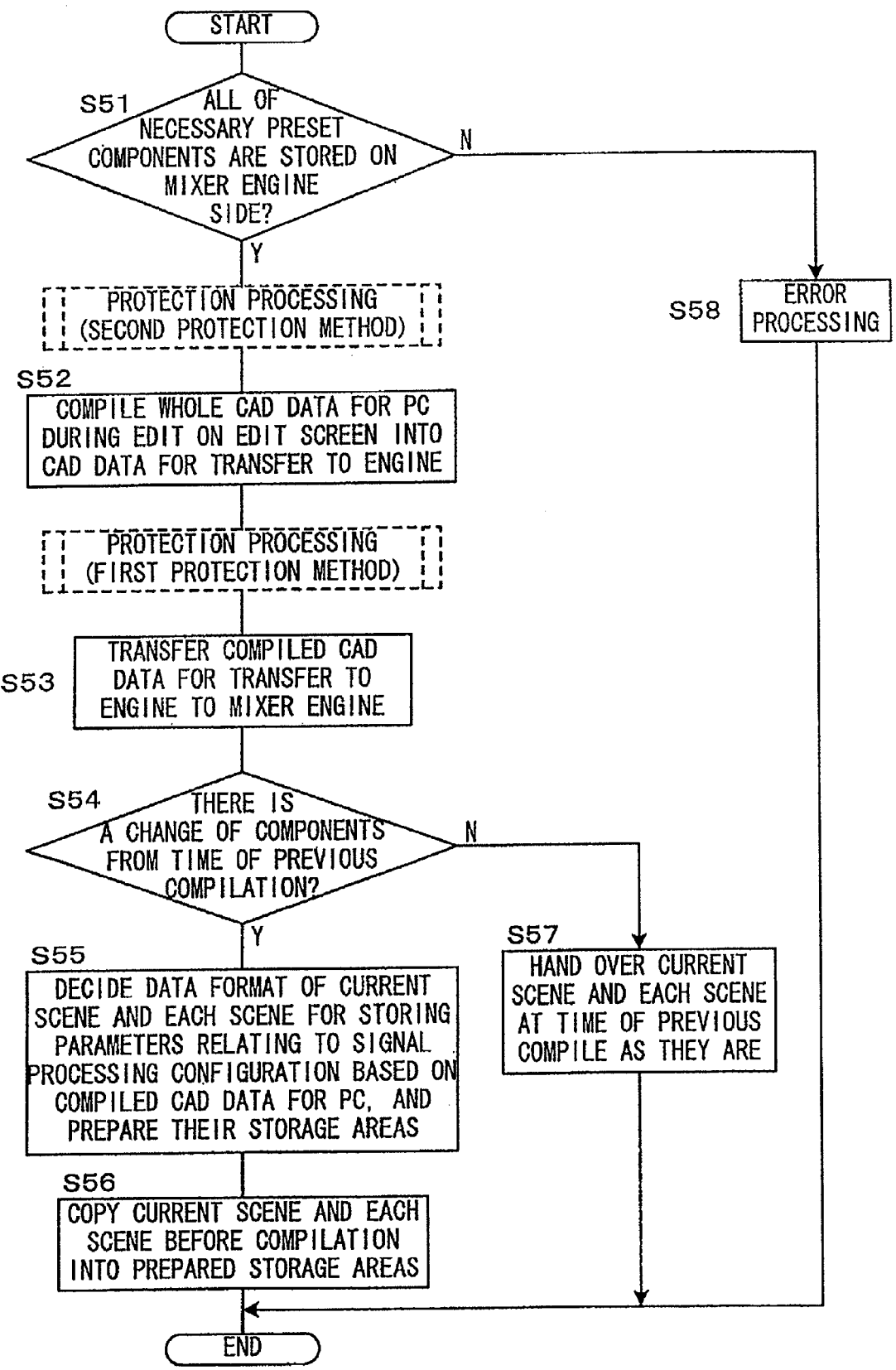
FIG. 13 is a flowchart of processing executed on the PC side when compile of configuration data is directed in the mixer system shown in FIG. 1.

First, FIG. 13 shows a flowchart of the processing executed on the PC 30 side when directed to compile configuration data.

When receiving from the user a direction to compile, the CPU of the PC 30 starts the processing shown in the flowchart of FIG. 13. Then, the CPU first judges whether or not the mixer engine 10 will execute the audio signal processing relating to the configuration data being a compile object stores all of the preset component data included in the configuration data in Step S51. If it is not stored, the CPU performs error processing in which it performs warning display or the like in Step S58, and ends the processing.

On the other hand, if the data is stored, the CPU compiles the whole CAD data for PC during edit into CAD data for transfer to engine and transfers the resulting data to a destination mixer engine 10 in Steps S52 and S53. The CPU of the PC 30 functions as a converter in the processing in Step S52 and as a transferring device in the processing in Step S53.

Then, in Step S54, the CPU judges whether or not there is a change of the components included in the CAD data from the time of previous compile. This change also includes a change of variations. If there is a change, the CPU prepares a storage area for storing parameters relating to the signal processing configuration based on the compiled CAD data for PC, and copies the current scene and each scene before the compile into the storage area, and ends the processing. Note that this copying is copying between different compositions in which components before and after edit of the CAD data are associated with each other through use of the above-described unique IDs and only portions of data corresponding between the associated components are copied. The contents will be described in detail in the description relating to the change of variations.

On the other hand, if there is no change in Step S54, the CPU hands over the current scene and each scene at the time of previous compile as they are in Step S57 and ends the processing. Generally, there is a demand to hand over the setting of parameters for unchanged components, which is the reason why the above arrangement has been made.

The above processing allows the data on the signal processing configuration edited on the PC 30 side to be transferred to the mixer engine 10 and corresponding values of parameters among those relating to the signal processing configuration at the time of previous transfer to a latest signal processing configuration. Note that when attaching importance to response, it is also possible to hand over the parameters only for the current scene, or to hand over the parameters first only for the current scene and then hand over those for each scene as background processing.

It should be noted that when the compile is performed while one configuration data is being edited, its configuration ID is the same as that immediately before the compile, and therefore the copying between the different compositions in Steps S54 to S57 is possible. Conversely, if the configuration ID is different from that at the time of previous compile, it is predicted that the signal processing configuration is completely different from that at the time of previous compile, and therefore preferably the CPU does not perform the processing in Steps S54 to S57. In place of the above processing, the CPU preferably writes predetermined initial values in the storage area prepared in processing similar to that in Step S55.

Figure 14:
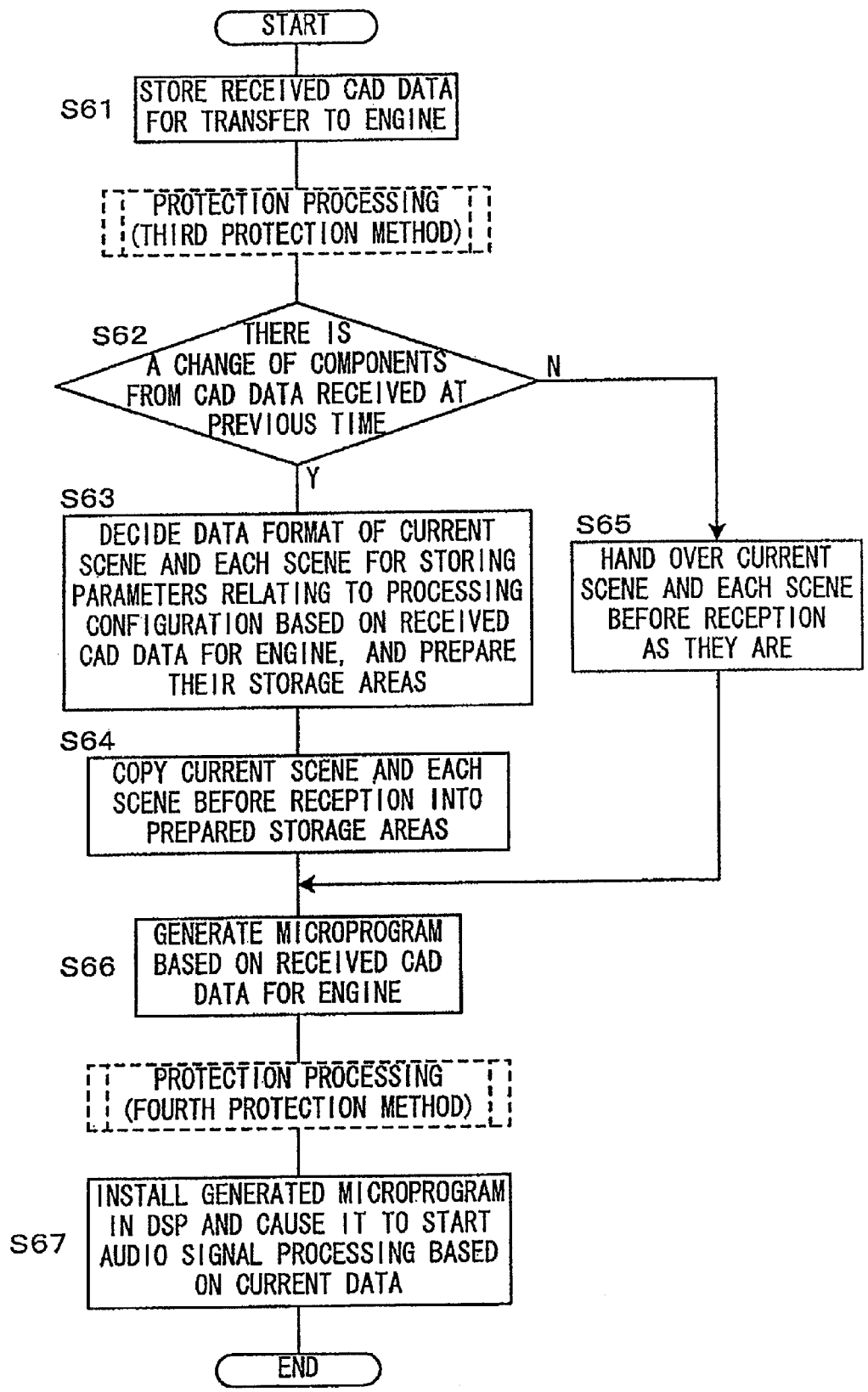
FIG. 14 is a flowchart of processing executed by the mixer engine when it receives CAD data for transfer to engine in the same.

Next, FIG. 14 shows a flowchart of the processing executed by the mixer engine 10 when receiving the CAD data for transfer to engine.

When receiving the CAD data for transfer to engine transferred by the PC 30 in the processing in Step S53 in FIG. 13, the CPU 11 of the mixer engine 10 starts the processing shown in the flowchart of FIG. 14. Then, the CPU 11 stores the received CAD data for transfer to engine as CAD data for engine in Step S61, and the CPU 11 judges whether or not there is a change of the components included in the CAD data from the CAD data received at the previous time in Step S62. This change also includes a change of variations.

If there is a change, the CPU 11 copies the current scene and each scene before reception of the CAD data, in a storage area prepared based on the received CAD data by copying between different compositions in Steps S63 and S64, as in Steps S55 and S56 in FIG. 13. If there is no change in Step S62, the CPU 11 hands over the current scene and each scene at the time of receiving the CAD data as they are in Step S65, as in Step S57 in FIG. 13. In this case, if the configuration ID is different from that at the time of previous compile, it is preferable that the CPU 11 writes, in place of the processing in Steps S62 to S65, predetermined initial values into the storage area prepared in the processing similar to that in Step S63, as in the case of the above-described Steps S54 to S57.

After Step S64 or S65, the flow proceeds to Steps S66 and S67, in which the CPU 11 generates based on the received CAD data for engine a microprogram for causing the DSP 20 to execute the audio signal processing relating to the CAD data, installs the program in the DSP 20 and causes it to start the audio signal processing based on the current data, and ends the processing. The CPU 11 functions as a program generator in the processing in Step S66.

The above processing allows the DSP 20 to execute the audio signal processing in accordance with the CAD data received from the PC 30. Note that if the contents of the current scene and each scene before the reception of the CAD data match their contents before the compile on the PC 30 side, the contents of the current scene and each scene after the reception of the CAD data can be matched with their contents after the compile on the PC 30 side by the processing in Steps S62 to S65.

Figure 15:
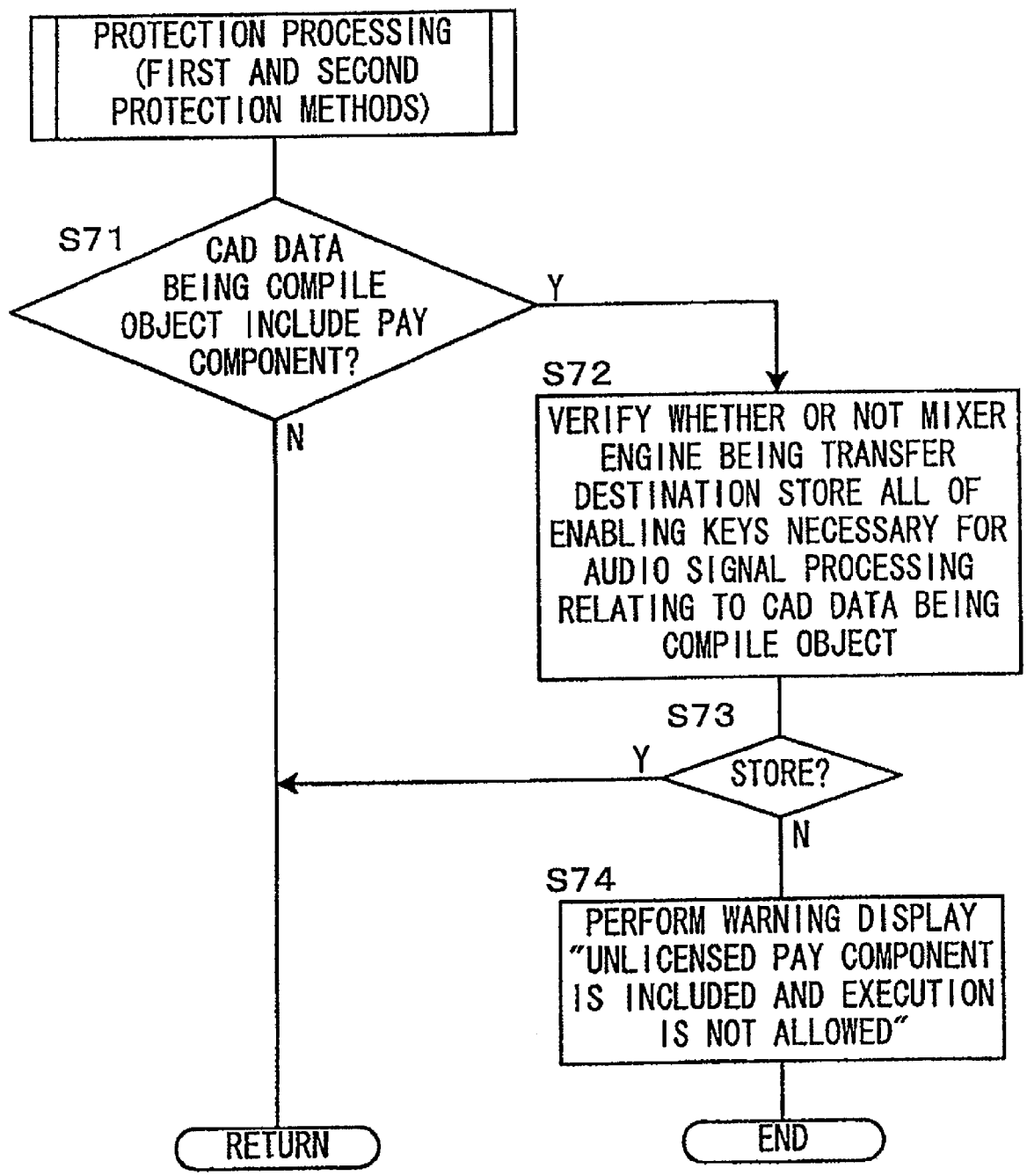
FIG. 15 is a flowchart of protection processing relating to a first and a second protection method executed on the PC side in the same.

Next, FIG. 15 shows a flowchart of the protection processing relating to the first and second protection methods executed on the PC 30 side.

In this processing, the CPU of the PC 30 first judges whether or not the CAD data being a compile object includes a pay component in Step S71. If the data does not include it, the CPU does not need to perform protection and thus returns to and continues the original processing.

On the other hand, if the data include it, the CPU verifies whether or not the mixer engine being the transfer destination stores all of the necessary enabling keys in Step S72. If the mixer does not store even one necessary enabling key, the flow proceeds from Step S73 to Step S74, in which the CPU performs warning display that the mixer engine lacks a necessary enabling key and ends the processing as it is. In this case, the audio signal processing relating to the object CAD data is disabled. On the other hand, if the engine stores all of the necessary enabling keys, the CPU does not need to disable the audio signal processing relating to the object CAD data and thus returns to and continues the original processing. In short, the CPU enables the audio signal processing relating to the object CAD data.

By the above processing, it is possible to disable the audio signal processing including a pay component and enable the audio signal processing when the enabling key for enabling the audio signal processing is stored in the mixer engine 10 which will execute the signal processing. In this processing, the CPU of the PC 30 functions as a disabling device in Steps S72 to S74, and when the judgment in Step S73 is YES, the CPU functions as an enabling device.

Note that the verification in Step S72 is preferably performed by inquiring of the mixer engine 10 to investigate the contents of the enabling keys stored in the mixer engine 10. This is because since connection between the mixer engine 10 and the PC 30 can be freely changed, the kinds of enabling keys actually stored in the mixer engine 10 are possibly different from those recognized on the PC 30 side.

Preferably, in this event, only when the ID of the mixer engine storing the enabling keys and the IDs of the pay components are included, the CPU judges that appropriate keys are stored. This judgment can prevent an act of copying the enabling key and using it in another mixer engine, thus providing an effect on prevention of illegal acts.

Incidentally, a possible timing to execute the processing shown in FIG. 15 is between Steps S52 and S53 (the first protection method), or between Steps S51 and S52 (the second protection method).

In the case of the first protection method, the CPU of the PC 30 functions as a disabling device that disables the audio signal processing by disabling transfer of the CAD data when the mixer engine 10 does not store a necessary enabling key. Besides, in the case of the second protection method, the CPU similarly functions as a disabling device that disables the audio signal processing by disabling conversion of the CAD data.

Next, FIG. 16 shows a flowchart of the protection processing relating to a third and a fourth protection method executed on the mixer engine 10 side. This processing corresponds to the processing shown in FIG. 15.

In this processing, the CPU 11 of the mixer engine 10 judges whether or not the audio signal processing relating to the received CAD data requires an enabling key for use in Step S81, and if the enabling key is not required, the CPU 11 returns to the original processing as it is and continues the processing.

On the other hand, if the enabling key is required, the CPU 11 verifies whether or not the mixer engine 10 itself stores all of the necessary enabling keys in Step S82. If the mixer engine 10 does not store even one necessary enabling key, the flow proceeds from Step S83 to Step S84, in which the CPU 11 directs the PC 30 to perform warning display that the mixer engine 10 lacks a necessary enabling key and ends the processing as it is. Additionally, the mixer engine 10 itself may perform warning display on the display 14. In this case, the audio signal processing relating to the object CAD data is disabled. On the other hand, if the CPU 11 stores all of the necessary enabling keys, the CPU 11 returns to the original processing from Step S83 and continues the processing. In short, the CPU 11 enables the audio signal processing.

By the above processing, the audio signal processing can be disabled and enabled as in the processing in FIG. 15. In this processing, the CPU 11 functions as a disabling device in Steps S82 to S84, and when the judgment in Step S83 is YES, the same CPU functions as an enabling device.

Besides, a possible timing to execute the processing shown in FIG. 16 is between Steps S61 and S62 (the third protection method) in FIG. 14, or between Steps S66 and S67 (the fourth protection method).

In the case of the third protection method, the CPU 11 functions as a disabling device that disables the audio signal processing by disabling generation of the microprogram for causing the DSP 20 to execute the audio signal processing when the mixer engine 10 does not store a necessary enabling key. Further, in the case of the fourth protection method, the CPU 11 similarly functions as a disabling device that disables the audio signal processing by disabling execution of the microprogram by the DSP 20. Note that in the fourth protection method, if the necessity of the enabling key can be judged only from the generated microprogram, reference to the CAD data is not essential in the protection processing. Besides, after the microprogram is installed in the DSP 20 in Step S67, execution thereof may be disabled.

The above-described first to fourth protection methods can be applied in an overlapping manner, but it is sufficient to apply at least one of them. However, if the mixer engine 10 has a configuration capable of performing audio signal processing even by itself, the third or fourth protection method, in which the disabling device is provided on the mixer engine 10 side so that the mixer engine 10 can disable the audio signal processing even by itself, is more preferable from the viewpoint of prevention of illegal acts.

By performing each of the above processing, only when the mixer engine 10 stores an appropriate enabling key, the audio signal processing using a pay component can be executed in the mixer engine 10. Accordingly, even when data on the pay component is provided to a user, the provider side can manage its use and easily charge for use of data and so on. Further, edit of the signal processing configuration using the pay component is possible even when there is no enabling key, so as for the user to recognize the usefulness of the pay component, thereby motivating the user to purchase its license.

The example has been described in which the number of stored enabling keys is not managed for the same pay component in the mixer engine 10 so that when there is only one enabling key, the processing is permitted even if any number of corresponding pay components exist in the signal processing configuration in the above-described processing. It is also preferable, however, to manage the number of stored enabling keys and require the same number of enabling keys as that of pay components included in the audio signal processing for execution of the audio signal processing. However, the management processing of the enabling key can be more simplified in the above-described processing.

Further, it is also conceivable that not only the CAD data for PC during edit as in the above-described processing but also any configuration data for PC stored in the PC 30 is transferred to the mixer engine 10 and stored as configuration data for engine. In this case, the PC 30, in response to the direction to transfer the configuration data, compiles the CAD data for PC included in the directed configuration data for PC to generate configuration data for engine including a configuration header, CAD data for engine, and a plurality of scene data, and transfers the resulting data to the mixer engine 10. The mixer engine 10 then stores the received configuration data for engine in the designated storage area of the RAM 13.

When the above-described first or second protection method is employed (when the protection processing is performed only on the PC 30 side), the following protection processing is preferably performed on the PC 30 side also in transfer of the above-described configuration data.

Specifically, it is preferable that processing similar to the processing shown in FIG. 15 or FIG. 16 is performed at the time of transferring the configuration data for PC, in which it is verified that no pay component is included in the CAD data for PC in the configuration data for PC to be transferred or that a pay component is included and the mixer engine 10 being the transfer destination stores an necessary enabling key, and then transfer of the configuration data for PC is executed only when the above is verified. When it is not verified, the PC 30 preferably issues a warning that the mixer engine 10 lacks a necessary enabling key. Note that the PC 30 does not need to perform compile when the mixer engine 10 does not store the necessary enabling key as in the second protection method.

Besides, when the above-described third or fourth protection method is employed (when the protection processing is performed on the mixer engine 10 side), such protection processing on the PC 30 side does not need to be performed.

Besides, when the configuration data transferred to the mixer engine 10 is used to control the mixer engine 10, the user preferably selects one of the plurality of configuration data for engine stored in the RAM 13 of the mixer engine 10, as the configuration data indicating the configuration of signal processing to be executed in the mixer engine 10. In this case, upon such a selection, the mixer engine 10 generates a microprogram based on the CAD data for engine in the selected configuration data for engine and supplies it to the DSP 20 to start a corresponding signal processing operation, prepares to access each scene of the selected configuration data for engine and a corresponding current scene based on the CAD data for engine, further initializes the current scene, and starts control of the signal processing operation based on the parameters of the current scene.

Further, when the above-described third or fourth protection method is employed (when the protection processing is performed on the mixer engine 10 side), the mixer engine 10 preferably performs the protection processing at the time of generating the microprogram or at the time of causing the DSP 20 to start the signal processing operation. In other words, the mixer engine 10 preferably verifies, at the time of starting the above processing, that the mixer engine 10 stores an enabling key necessary for the signal processing that the mixer engine 10 will execute, and executes the processing only when it is verified, as in the case of transfer described above.

Note that when the above-described first or second protection method is employed, configuration data, whose enabling key necessary for execution is not stored in the mixer engine 10, cannot be transferred to the mixer engine 10, and therefore such protection processing on the PC 30 side does not need to be performed.

Further, there is another known configuration as the configuration of the mixer system as shown in FIG. 1, in which a microprogram is generated on the PC side and transferred to the mixer engine. When the above-described protection processing is applied to such a mixer system, it is preferable to consider the microprogram generated on the PC side as data showing the edited signal processing configuration in the form suitable for the processing in the mixer engine, and to handle the program the same as the CAD data for transfer to engine (or the CAD data for engine) in the above-described processing.

In this case, there is a conceivable method, as the method corresponding to the first protection method, in which when the PC transfers the microprogram to the mixer engine, the necessity of the enabling key is judged from the preset component included in the CAD data for PC which is the base of the microprogram, and the transfer is disabled when the mixer engine does not store the necessary enabling key.

Besides, there is a conceivable method, as the method corresponding to the second protection method, in which when the PC generates the microprogram, the generation is disabled in a manner similar to the above.

Further, there is a conceivable method, as the method corresponding to the fourth protection method, in which when the mixer engine causes the DSP to execute the microprogram, the execution is disabled in a manner similar to the above.

Note that also when each of the above described modifications is applied, management of the enabling key can be applied which is similar to the above-described first or second management method.

4. Description on Change of Variations: FIG. 17 to FIG. 28C

Next, change of variations of a component during edit of the signal processing configuration in this mixer system will be described.

The use and function of variations will be first described taking an AutoMixer having variations on the number of input nodes as an example and using FIG. 2 and FIG. 17. The AutoMixer is a component that outputs an input at a maximum level as it is and attenuates the other inputs.

For example, if the signal processing configuration as shown in FIG. 2 is edited, the component AutoMixer is in a state in which all of its input nodes are in use. Accordingly, when it is tried to arrange a new input portion as shown by a broken line in FIG. 17 and input the signal therefrom into the AutoMixer, the illustrated wires cannot bet set because the AutoMixer has no unused input nodes. However, the component AutoMixer is changed to a component having more input nodes, that is, a variation having 6 inputs, whereby the wires as illustrated by the broken lines in FIG. 17 can be set.

Conversely, when the input portion shown by the broken line is deleted from the state in which all of the 6 input nodes are in use as shown in FIG. 17 or the like, only four inputs nodes are required, and therefore the component is changed to a component having fewer input nodes, that is, a variation having 4 inputs, whereby the resource required for the signal processing in the DSP 20 can be decreased.

Further, in this mixer system, when the variation is changed, a wire which has a corresponding node also in the component after the replacement, among the wires connected to the nodes of the original component, is handed over to the component after the replacement. In addition, a value of a parameter whose corresponding parameter exists also in the component after the replacement, among the values of parameters relating to the original component, is handed over to the component after the replacement.

The change of variations means replacement by a component having the same basic function of processing, and therefore there is a strong demand that the setting on the component before the change is also maintained in the component after the change. Accordingly, the above-described processing can minimize the efforts for resetting of wires and parameters for replacement of components, thereby improving the operability in edit of the signal processing configuration. The above-described processing can also make the contents of the edit operation intuitive and easily understandable.

The above processing is made possible owing to special definition, that is, variations being given to the group of components having the same basic function of processing so that the correspondence between the original component and the component after the replacement can be easily recognized.

Next, operation and processing in changing variations described above will be described.

An example of a property setting screen is first shown in FIG. 18.

In the CAD screen 40 shown in FIG. 2 and FIG. 17, when a component arranged in the screen is selected and a property change is selected from a menu, a property setting screen 60 as shown in FIG. 18 is displayed as a pop-up window.

This screen has a label setting section 61, a width setting section 62, a height setting section 63, a variation setting section 64, a color setting key 65, a cancel key 66, and an OK key 67.

The width setting section 62 and the height setting section 63 of them allows setting of the width and height of a symbol when the component is displayed on the CAD screen 40 respectively, and the label setting section 61 allows setting of a character string of a label attached to the symbol of the component.

Further, the variation setting section 64 allows setting of what variation of component is employed, as the aforementioned selected component, from among the corresponding preset components. In addition, the variation setting section 64 forms a pull-down menu so that when an inverted triangle icon on the right side is clicked on, a menu as shown in FIG. 19 is displayed to allow selection of a variation.

Since the AutoMixer shown here as an example has variations different only in the number of input nodes, the display contents of the variation setting section 64 are those as shown in FIG. 18 and FIG. 19. However, for example, when there are variations in the numbers of both input and output nodes as in a matrix mixer, it is also conceivable to accept settings of two parameters, that is, the number of input nodes and the number of output nodes as shown in FIG. 20A. Besides, when there are variations in the number of bands as in a parametric equalizer, the setting of the number of bands is accepted as in FIG. 20B.

The color setting key 65 is a key for displaying a screen for setting a display color of a component on the CAD screen 40.

Besides, a press of the cancel key 66 returns the CAD screen 40 to its original screen without reflection of the setting change until then. A press of the OK key 67 returns the CAD screen 40 to its original screen with reflection of the setting change until then.

In this event, if the width, height, variation, color, and so on of a component are changed, the CAD screen 40 is redrawn in accordance with the settings after the change. Besides, the property data after the change is stored as the property data in the CAD data for PC shown in FIG. 3.

Figure 21:
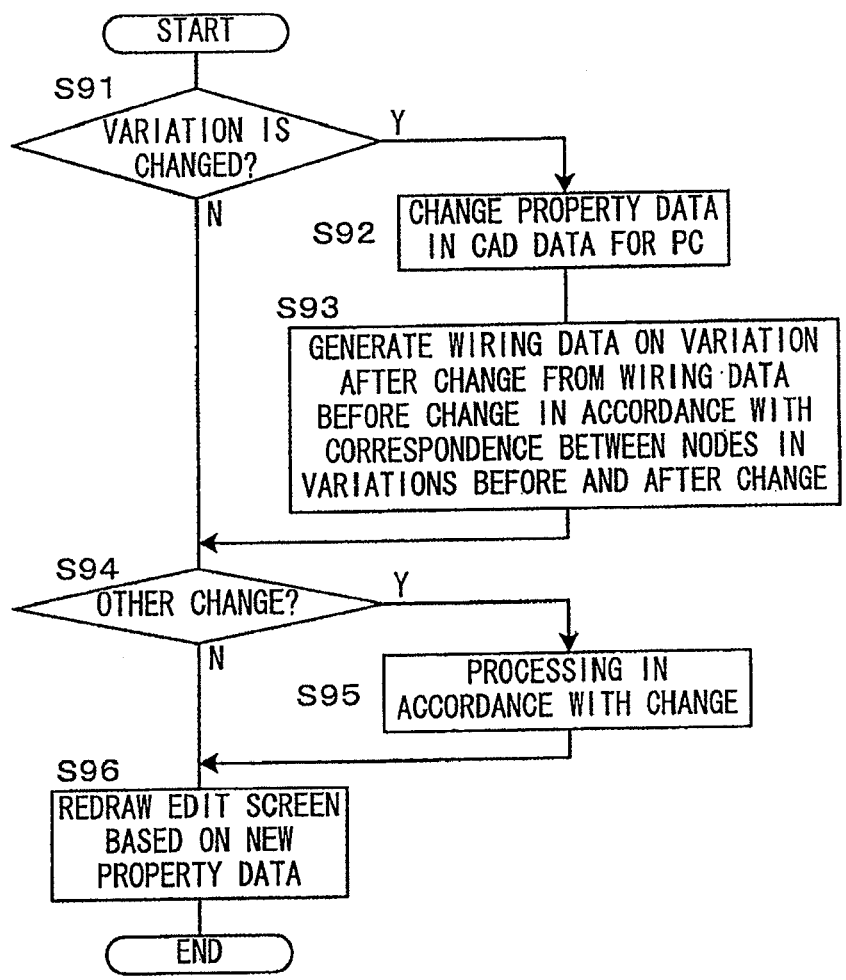
FIG. 21 is a flowchart of processing for reflecting the setting contents on the property setting screen, executed by the PC in the mixer system shown in FIG. 1.

Next, FIG. 21 shows a flowchart of processing for reflecting the setting contents on the property setting screen 60. This processing is processing executed by the CPU of the PC 30 when the OK key 67 on the property setting screen 60 is pressed.

In this processing, when the CPU is directed to change the variation in the variation setting section 64, the CPU changes the variation data included in the property data in the CAD data for PC in accordance with the contents of the direction, and generates wiring data on the variation after the change from the wiring data before the change in accordance with the correspondence between nodes in the variations before and after the change in Steps S91 to S93. In the processing in Step S93 of the above, the CPU of the PC 30 functions as a first hand-over device.

Then, in Steps S94 and S95, when there is a change in size, color, or the like other than the above of a component, the CPU performs processing in accordance with the change such as changing the property data in the CAD data for PC in accordance with the contents of the change. Note that when there is a change of variations, it is also conceivable to automatically set an appropriate size in accordance with the number of nodes or the like after the change, and processing relating to the size change in that case is also performed in these steps.

Then, in Step S96, the CPU redraws the CAD screen 40 based on the new property data after the change by the processing until then, and ends the processing.

The above processing makes it possible that even when the variation of a component is changed and the component is replaced with its different variation, the CPU can hand over usable wires to the component after the replacement, among the wires set for the variation before the change.

Figure 22A:
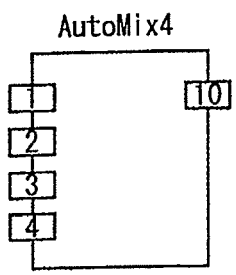
FIG. 22A to FIG. 22C diagrams showing examples of variation of an AutoMixer in the mixer system shown in FIG. 1.
Figure 22B:
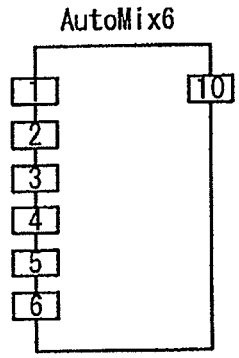
Figure 22C:
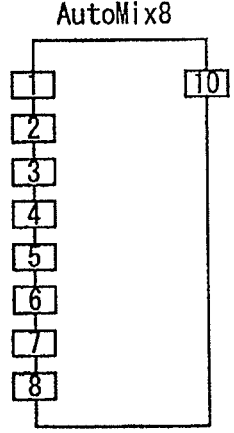

The correspondence between the nodes in the respective variations and the hand-over contents of the wires will be described here in more detail. FIG. 22A to FIG. 22C show display examples of 4-input, 6-input, and 8-input AutoMixer components as examples of variations of the AutoMixer, respectively.

Among the variations, the nodes with the same numerals attached correspond with each other. An output node on the right side of them is arranged one for each variation, and therefore these are naturally made to correspond with each other. Further, to the input nodes on the left side, numerals are attached to the nodes in sequence from the node displayed at the top, and when the number of nodes is increased, the nodes are added to the lower side, while when the number of nodes is decreased, the nodes are deleted from the lower side.

In generating wiring data on the component after the replacement based on this correspondence, if a node corresponding to that of the original component exists in the component after the replacement, the CPU continuously wires the node with the same original partner, and if there is no corresponding node, the CPU deletes the wiring data on the original node.

For example, when the 4-input AutoMixer is replaced with the 6-input AutoMixer by change of variations, the wiring data on the output node and on a first to a fourth input node before the change are handed over as they are as the wiring data on the 6-input AutoMixer, and there is no wiring data on a fifth and a sixth input node. Conversely, when 6 inputs are changed to 4 inputs, the wiring data on the output node and on the first to fourth input nodes before the change are handed over as they are as the wiring data on the 4-input AutoMixer, and the wiring data on the fifth and sixth input nodes are deleted because there are no corresponding nodes after the change.

Note that if the wire losing its connection destination is still displayed in a state of a free end even when the wiring data is deleted, the wire can be easily reset. It is preferable to similarly cope with the output node when the number of output nodes can be changed. Alternatively, it is also suitable for the user to set arbitrarily the correspondence between the nodes at the time of changing variations.

Incidentally, in this mixer engine, when the variation of a component is changed, the value of a parameter set on the component is also handed over to the component after the replacement if there is a parameter corresponding to the original one. This processing is performed when the PC 30 executes "Compile" after the end of setting of property, as a part of the processing relating to the compile, in the processing in Steps S55 and S56 of FIG. 13. The reason why the hand-over processing is performed at this point in time is that the current memory and scene memory being the storage area for parameters are prepared only after the compile. Note that the similar processing is performed on the mixer engine 10 side also in Steps S63 and S64 of FIG. 14.

Figure 23:
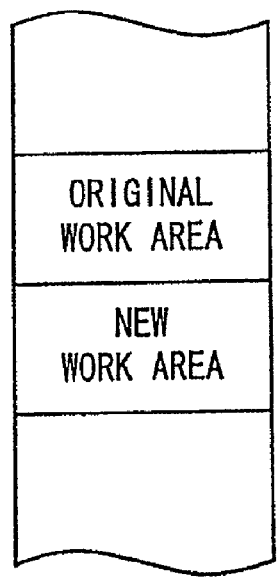
FIG. 23 is a diagram for explaining a work area prepared on a memory of the PC in parameter hand-over processing in the same.
Figure 24:
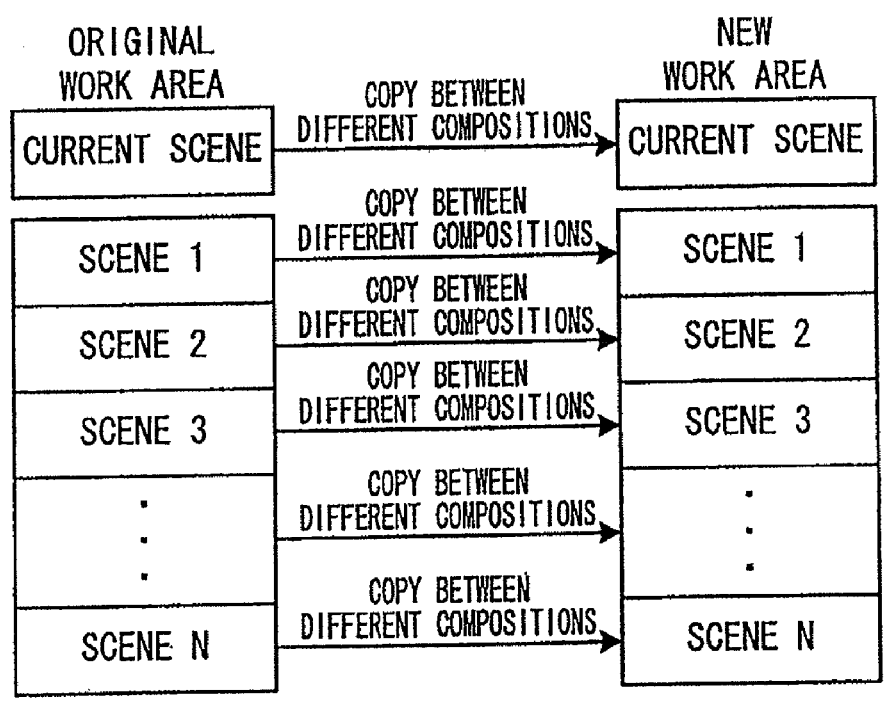
FIG. 24 is a diagram for explaining handling of scene data when there is a change of components in the same.

This parameter hand-over processing will be described here. In this processing, a new work area is prepared on the memory as shown in FIG. 23, the data format of the current scene and each scene for storing parameters relating to the processing configuration compiled based on the CAD data for PC is decided, their storage areas are prepared. Then, as shown in FIG. 24, the contents of the current scene and each scene are copied from the original work area into the new work area. In this event, the original work area and the new work area are different in data composition of the scene, and therefore the copying is copying between different compositions.

Figure 25A:
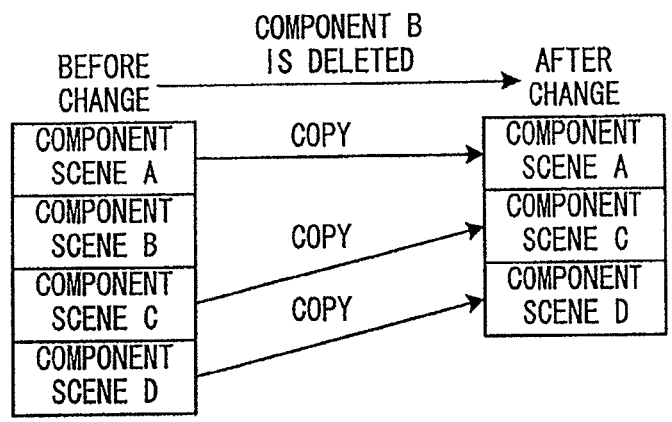
FIG. 25A to FIG. 25C are diagrams for explaining copying between different compositions shown in FIG. 24.
Figure 25B:
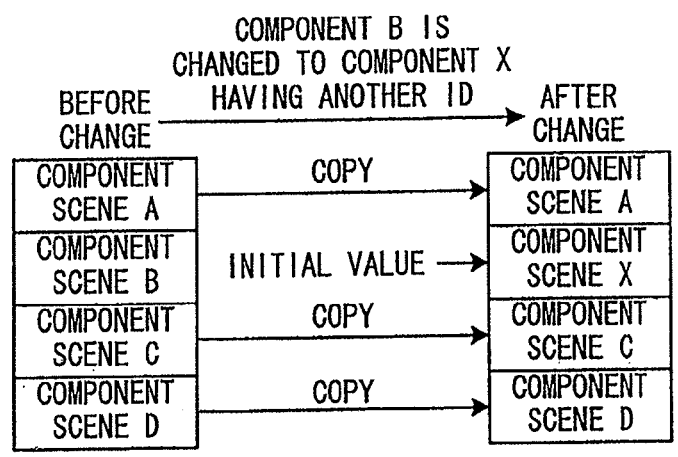
Figure 25C:
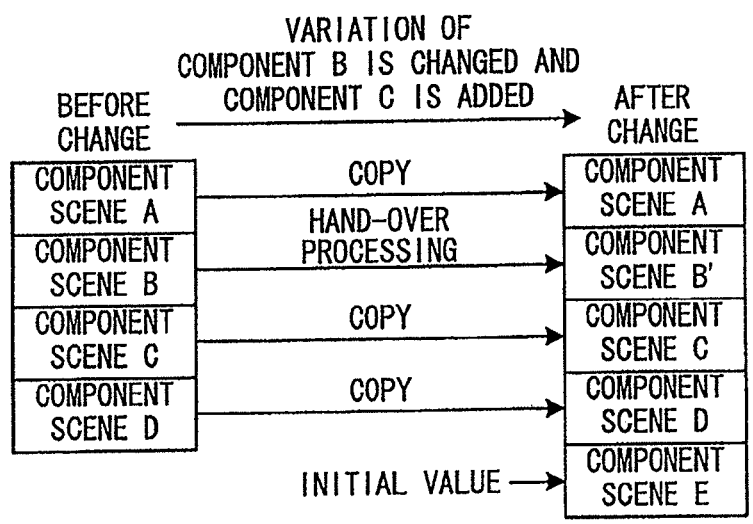

Concrete examples of the copying between different compositions are shown in FIGS. 25A to 25C.

First, when a component is deleted as shown in FIG. 25A, the only requirement is not to copy the component scene relating to the deleted component. What component is deleted can be verified from a newly deleted unique ID.

Alternatively, when a component is changed to a component having another ID as shown in FIG. 25B, a component scene relating to the component after the change is provided in place of the component scene relating to the component before the change. Then, since there is no data to be copied, a predetermined initial value is set. Note that the component before the change and the component after the change are different not only in the component ID but also in the unique ID.

When a component is added as shown in FIG. 25C, a component scene relating to the added component is provided at the end of the scene, in which a predetermined initial value is also set. What component is added can be verified from a newly added unique ID.

Figures 26, 27A, 27B:
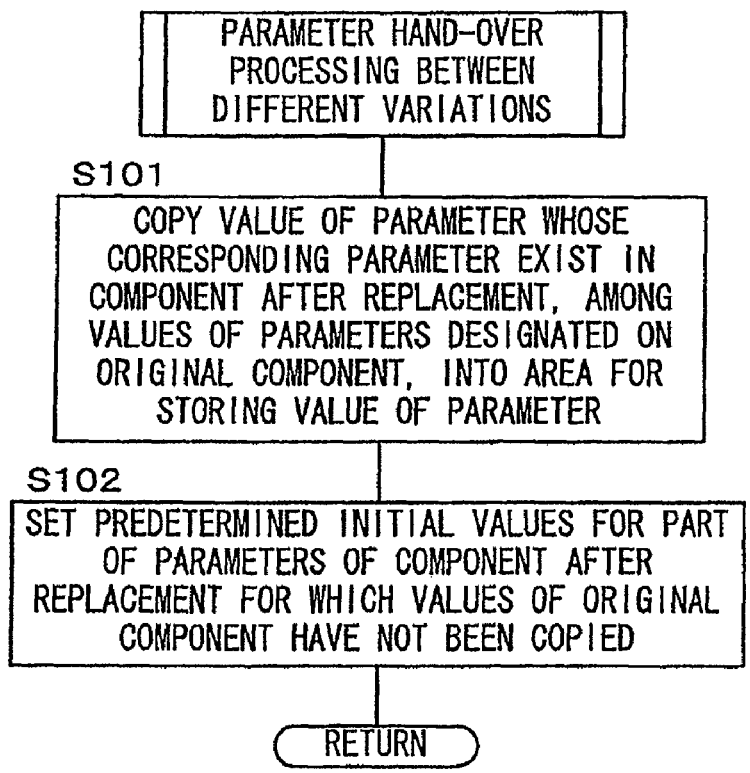
FIG. 26 is a flowchart showing parameter hand-over processing between different variations executed as a part of the copying between different compositions shown in FIG. 24.
FIG. 27A and FIG. 27B are diagrams for explaining element composition of parameters in components for use in the mixer system shown in FIG. 1.

When the variation of a component is changed to another, the components before and after the change are the same in the unique ID and the component ID, and therefore the correspondence between the components before and after the change can be recognized and the two components having data compatibility can be verified, so that parameter hand-over processing between different variations as shown in FIG. 26 is performed. To perform this parameter hand-over processing, it is only required that they have the same component ID, and the processing is executable even between components having different unique IDs.

In the hand-over processing, first in Step S101, the CPU copies the value of a parameter whose corresponding parameter exists in the component after the replacement, among the values of parameters designated on the original component, to an area for storing the value of the corresponding parameter of the current memory prepared in the above-described new work area.

Thereafter, in Step S102, the CPU sets predetermined initial values for a part of the parameters of the component after the replacement for which the values of the original component have not been copied in Step S101, and returns to the original processing.

The above processing shall be performed for each component when variations of a plurality of components are changed. In this processing, the CPU of the PC 30 functions as a second hand-over device and functions as a writer especially in Step S101.

Next, the correspondence between parameters before and after the change of variations will be described.

In this mixer system, the parameters for each component are defined separated into units of elements. FIG. 27A shows a composition of elements in the 4-input AutoMixer and FIG. 27B shows that in the 6-input AutoMixer. Note that each element is an aggregation of one or more parameters.

As shown in these drawings, in the 4-input AutoMixer, the parameters are composed of elements E1 to E5, in which the elements E3 are parameter groups for controlling input. Since there are 4 inputs, parameter storage areas for the elements E3 corresponding to the respective input nodes are provided as elements E3[1] to E3[4].

On the other hand, in the 6-input AutoMixer, it has a basic portion of processing common with the 4-input AutoMixer and thus has common parameters to be set therefor, and its parameters are composed of elements E1 to E5 as in the case of the 4 inputs. However, the number of input nodes is 6, and therefore six element E3s, E3[1] to E3[6], are provided.

Accordingly, the 4-input AutoMixer and the 6-input AutoMixer have completely common parameters relating to the elements E1, E2, E4, and E5, and therefore it can be said that these parameters correspond with each other. Further, the parts E3[1] to E3[4] of the element E3s commonly exist, and therefore it can be said that these parameters also correspond with each other. On the other hand, there is no correspondence in the parameters relating to the elements existing in only one of the AutoMixers, such as the elements E3[5] and E3[6].

The components of different variations have a common basic part of processing, and therefore their parameters to be set are common in the kind but different in the number of elements. Accordingly, the correspondence between parameters of other than the AutoMixer can be considered to be the same as that in the above-described case. Note that the element composition in each variation and the kinds of parameters included in each element are written in the part of the data composition data in the preset component data.

Next, a copying method when the parameters composed of the above-described elements are handed over from the component being a replacement source to the component after the replacement will be described using FIGS. 28A to 28C. In these drawings, Ex indicates the value of a parameter on the original component, and Eo indicates a predetermined initial value to be set when an area is prepared.

FIG. 28A shows a case in which there is only one identical element such as the element E1 or E2 shown in FIG. 27A and FIG. 27B. Preferably, in this case, the value on the original component is simply copied to the storage area prepared for the component after the replacement.

FIG. 28B shows a case in which a plurality of identical elements are arranged in one dimension similarly to the elements E3 shown in FIG. 27A and FIG. 27B. In this case, the values of the original component are copied to parts for corresponding elements of the storage area prepared for the component after the replacement. Accordingly, no values are copied to parts for elements not included in the original component of the storage area, where predetermined initial values are left as set, and the value relating to the element not included in the copying destination is discarded.

FIG. 28C shows a case in which a plurality of identical elements are arranged in two dimensions. There is no such example in FIG. 27A and FIG. 27B, but, for example, when there are a plurality of input nodes and output nodes respectively, parameter groups which are set for each combination thereof form such elements. Also in this case, the basic concept is the same as in the case of FIG. 28B, in which the values of the original component are preferably copied to parts for corresponding elements of the storage area prepared for the component after the replacement. Further, predetermined initial values are left at parts of the storage area into which nothing is copied, and the value having no copying destination is discarded. This also applies to the case in which elements are arranged in three or more dimensions.

Based on the above-described concept, the values of the parameters can be handed over as illustrated using FIG. 27A and FIG. 27B. Note that it is also possible not to set the initial values at the time when the parameter storage area is provided for the component after the replacement but to set the initial values after copying of necessary values only for the part into which nothing is copied.

It should be noted that main cases for handing over values of parameters as described herein are as follows.

One case is handing over of parameters of one component when the preset component is version-upgraded. In this case, the preset component ID is not changed but only the preset component version is changed. The components having the same preset component ID, however, have data compatibility of parameters, so that the parameters of the component in the old version stored in the scene or library can be handed over as the parameters of the component in the new version. This is as illustrated using FIG. 26 to FIG. 28C. Further, it is not necessary that the configuration IDs match each other in this event.

Another case is handing over of parameters of one scene when the preset component is version-upgraded, from the configuration data including the component in the old version to the configuration data including the component in the new version, and the components having the same configuration ID. In this case, because of the same configuration ID, the correspondence between the components can be recognized by referring to unique IDs, including the version-upgraded component. The two components whose correspondence has been recognized are possibly different in version but should have the same preset component ID. Accordingly, the associated components have data compatibility of parameters, so that the scene can be handed over between the configurations.

Still another case is handing over of licenses and parameters of one component when a pay component is version-upgraded. Since the preset component ID does not change even when the pay component is version-upgraded, the enabling key is issued corresponding to the preset component ID as described above, whereby the version-upgraded component can be continuously used with the enabling key corresponding to that in the old version. Further, the parameters of the component in the old version can be handed over as in the above-described case. In this event, it is not necessary that the configuration IDs match each other. Further, as in the above-described case, parameters of one scene can be handed over from the configuration data including the component in the old version to the configuration data including the component in the new version.

Further, parameters can be handed over between two components having the same preset component ID and different variation data, as illustrated using FIG. 26 to FIG. 28C. The parameters of one scene can be handed over between the configuration data before and after the change of variations of a component included in the signal processing configuration, as illustrated using FIG. 24 and FIG. 25A to FIG. 25C.

With the above, the description of the embodiments comes to the end, but the invention is not limited to the above-described embodiments. For example, the composition of data is not limited to those shown in FIG. 3 and FIG. 4, and a dedicated editing device or controller may be used as the editing device in place of the PC 30. The audio signal processing device is not limited to one, but a plurality of devices may be simultaneously connected to the editing device.

As has been described, according to the invention, in an audio signal processing system in which an editing device edits a configuration of signal processing in an audio signal processing device and the audio signal processing device performs signal processing in accordance with the edited contents, it is made possible to effectively prevent illegal use of data on components of the signal processing while maintaining convenience and operability of the system. Accordingly, the use of the invention allows easy management of use of the data on the components and development of a business of selling the data.

Further, according to the invention, when an audio signal processing system, in which an editing device edits contents of signal processing in an audio signal processing device and the audio signal processing device performs signal processing in accordance with the edited contents, is constituted, operability in replacing components for signal processing can be improved. Accordingly, the use of the invention can provide an editing device and an audio signal processing system with high operability.

TABLE 1

| Kind of Component | Variation Contents |
| --- | --- |
| AutoMixer | Number of Input Nodes (4, 6, 8, ... ) |
| CrossOver | Number of Output Nodes (1, 2, 4, ... ) |
| Delay | Number of Output Nodes (1, 2, 4, ... ) |
| DelayMixer | Numbers of Input and Output Nodes (4in2out, 6in2out, 4in4out, ... ) |
| MatrixMixer | Numbers of Input and Output Nodes (4in2out, 6in2out, 4in4out, ... ) |
| Parametric Equalizer (PEQ) | Number of Bands (2, 4, 6, ... ) |
| Fader | Number of Channels (1, 2, 4, ... ) |
| . | . |
| . | . |
| . | . |

What is claimed is:

1. A method of controlling an editing device that edits in accordance with a direction accepted on a graphical screen a configuration of signal processing comprising a plurality of components each having an input node or an output node and wires connecting the output nodes and input nodes of the components in an audio signal processing device having an audio signal processor wherein processing contents can be programmed, said method for causing the editing device to store definition of a plurality of variations for at least one of the components, to store correspondence between nodes and between parameters included in the variations in the component, and to execute:

a step of accepting a direction to change the variation for the component included in the signal processing configuration during edit when editing the signal processing configuration;

when accepting the direction to change in said step, a step of replacing the component relating to the direction with a component of another variation in accordance with the direction;

a first hand-over step of handing over to the component after the replacement, based on the stored correspondence, a wire which has a corresponding node also in the component after the replacement, among wires connected to nodes of an original component before the replacement; and a second hand-over step of handing over to the component after the replacement, based on the stored correspondence, a value of a parameter whose corresponding parameter exists also in the component after the replacement, among values of parameters relating to the original component, wherein said second hand-over step comprises:

a step of preparing a storage area for the parameter corresponding to the component after the replacement;

a write step of writing a value of a parameter whose corresponding parameter exists in the component after the replacement, among values of parameters relating to the original component, into an area for storing the value of the parameter of the storage area; and a step of setting a predetermined initial value for a parameter for which write has not been performed in said write step, among the parameters to be stored in the storage area.

2. A method of controlling an editing device that defines a configuration of signal processing executed in an audio signal processing device having a programmable audio signal processor, by a plurality of signal processing components each having an input terminal or an output terminal and wires connecting the output terminals and the input terminals of the signal processing components, and edits the configuration of signal processing defined by the signal processing components and the wires in accordance with a direction accepted on a graphical screen, the method comprising: controlling the editing device such that the editing device stores definition data defining the plurality of signal processing components, at least a part of the plurality of signal processing components being defined as signal processing component having plural variations respectively provided with different numbers of terminals and/or different numbers of parameters used in the signal processing, and stores correspondence of the terminals and parameters between different variations among the plural variations of the signal processing component, and controlling the editing device such that the editing device executes:

an accepting step of accepting, from a user, a direction to change one variation of a signal processing component to another variation of the signal processing component, for the signal processing component included in the signal processing configuration under the edit, when editing the signal processing configuration; a replacing step of, when accepting the direction to change in said accepting step, replacing the one variation of the signal processing component relating to the direction with the another variation of the signal processing component in accordance with the direction; a first hand-over step of connecting wires, among the wires connected to the terminal of the one variation of the signal processing component before the replacement, connected to the terminals corresponding to any of the terminals of the another variation of the signal processing component after the replacement, with the corresponding terminals based on the stored correspondence; and a second hand-over step of storing values of parameters, among the parameters used in the signal processing according to the one variation of the signal processing component before the replacement, corresponding to any of the parameters used in the signal processing according to the another variation of the signal processing component after the replacement, as values of the corresponding parameters based on the stored correspondence, wherein said second hand-over step comprises: a step of preparing a storage area for storing values of the parameters used in the signal processing according to the another variation of the signal processing component after the replacement; a write step of writing, values of parameters, among the parameters used in the signal processing according to the one variation of the signal processing component before the replacement, corresponding to any of the parameters used in the signal processing according to the another variation of the signal processing component after the replacement, into an area for storing the values of the corresponding parameters; and a step of writing a predetermined initial value for a parameter for which the storage area is prepared but a value has not been written in said write step, into an area for storing the value of the parameter.

* * * * *